(12) United States Patent
Kim

(10) Patent No.: US 9,106,786 B2
(45) Date of Patent: Aug. 11, 2015

(54) ETHERNET-BASED IMAGE TRANSMITTING/RECEIVING SYSTEM

(71) Applicant: SAMSUNG TECHWIN CO., LTD., Changwon (KR)

(72) Inventor: Hak-jae Kim, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 207 days.

(21) Appl. No.: 13/714,585

(22) Filed: Dec. 14, 2012

(65) Prior Publication Data
US 2013/0155260 A1  Jun. 20, 2013

(30) Foreign Application Priority Data
Dec. 14, 2011  (KR) .................. 10-2011-0134461

(51) Int. Cl.
*H04N 5/225* (2006.01)
*H04N 7/10* (2006.01)
*H04N 7/18* (2006.01)
H04N 21/2381 (2011.01)

(52) U.S. Cl.
CPC ............... *H04N 7/10* (2013.01); *H04N 7/183* (2013.01); *H04N 21/2381* (2013.01)

(58) Field of Classification Search
CPC ..... H04N 7/10; H04N 7/183; H04N 21/4147; H04N 21/4223
See application file for complete search history.

(56) References Cited

U.S. PATENT DOCUMENTS 5,877,802 A    3/1999  Takahashi et al.
6,697,101 B1 *  2/2004  Takahashi et al. .............. 348/71

FOREIGN PATENT DOCUMENTS

JP    2003244686 A    8/2003

OTHER PUBLICATIONS

Halak et al., "Receiver synchronization in video streaming with short latency over asynchronous networks", 2010 IEEE 13th International Symposium on Design and Diagnostics of Electronic Circuits and Systems, IEEE, Piscataway, NJ, USA, Apr. 14, 2010, pp. 403-405.
Communication dated Apr. 4, 2013 from the European Patent Office in counterpart application No. 12197189.9.
Communication dated Sep. 16, 2014 issued by European Patent Office in counterpart European Application No. 12197189.9.
DVB Organization; "Pp07-12r.doc"; DVB; Oct. 3, 2003; 7 pages total; Geneva—Switzerland; XP 017824655.

* cited by examiner

*Primary Examiner* — Twyler Haskins
*Assistant Examiner* — Dwight C Tejano
(74) *Attorney, Agent, or Firm* — Sughrue Mion, PLLC

(57)  ABSTRACT

An Ethernet-based image transmitting/receiving system including a image transmitting device configured to generate and transmit a packet including at least one multiplexed signal of a luminance signal and a chrominance signal; an image receiving device configured to receive the packet, extract the luminance signal and the chrominance signal from the multiplexed signal of the packet, store the luminance signal and the chrominance signal, and output the luminance signal and the chrominance signal by synchronizing lines with each other based on the synchronization information; and an Ethernet cable configured to connect the image transmitting device to the image receiving device and transmit the packet.

22 Claims, 19 Drawing Sheets

FIG. 5

| Data[7:0]<br>Bit number | 1st Word<br>(FF) | 2nd Word<br>(00) | 3rd Word<br>(00) | 4th Word<br>(XY) |
|---|---|---|---|---|
| 7(MSB) | 1 | 0 | 0 | 1 |
| 6 | 1 | 0 | 0 | F |
| 5 | 1 | 0 | 0 | V |
| 4 | 1 | 0 | 0 | H |
| 3 | 1 | 0 | 0 | P3 |
| 2 | 1 | 0 | 0 | P2 |
| 1 | 1 | 0 | 0 | P1 |
| 0 | 1 | 0 | 0 | P0 |

ETHERNET-BASED IMAGE TRANSMITTING/RECEIVING SYSTEM

CROSS-REFERENCE TO RELATED PATENT APPLICATION

This application claims priority from Korean Patent Application No. 10-2011-0134461, filed on Dec. 14, 2011, in the Korean Intellectual Property Office, the disclosure of which is incorporated herein in its entirety by reference.

BACKGROUND

1. Field

Apparatuses and methods consistent with exemplary embodiments relate to an Ethernet-based image transmitting/receiving system.

2. Description of the Related Art

FIG. 15 is a block diagram of a related art image transmitting/receiving system 1.

In the FIG. 15, the related art image transmitting/receiving system 1 uses serial digital interface (SDI) transmission technology.

An image transmitting device 2 transforms an electrical analog signal obtained by an image sensor 11 into a parallel signal including a luminance (Y) signal and a chrominance (C) signal by using an image signal processor 12, and transforms the parallel signal into a serial signal by using an encoder 13. When the encoder 13 is a high definition (HD)-SDI encoder, the encoder 13 may transform the parallel signal into a single-bit serial signal according to an HD-SDI standard. The serial signal undergoes a scrambling process for removing a direct current (DC) component by using a scrambler 14, and is transmitted to a coaxial cable 4, which is a serial line, via a driver 15 for matching with cable impedance of the coaxial cable 4.

An image receiving device 3 compensates for a high-frequency loss of the serial signal received from the coaxial cable 4 by using an equalizer (EQ) 16, performs a descrambling process on a resultant serial signal by using a descrambler 17, and transforms the serial signal into a parallel signal by using a decoder 18. At this time, the decoder 18 may perform the signal transformation according to the HD-SDI standard corresponding to an encoder standard of the image transmitting device 2. The parallel signal may undergo digital signal processing by using a control unit 19, and then, may be digitally compressed, recorded, or transmitted via a network.

SUMMARY

One or more exemplary embodiments provide an image transmitting/receiving system capable of accomplishing long-distance transmission of a high-definition (HD) digital image signal at a low cost.

According to an aspect of an exemplary embodiment, there is provided an Ethernet-based image transmitting device including: a signal processing unit configured to transform an analog image signal received from an image sensor into a digital signal comprising a luminance signal and a chrominance signal; a control unit configured to multiplex the luminance signal and the chrominance signal to generate a multiplexed signal having synchronization information; a medium access control (MAC) module configured to generate a packet including at least one multiplexed signal including the multiplexed signal; and a physical (PHY) module configured to transmit the packet in an Ethernet transmission format via an Ethernet cable.

The control unit may include: a multiplexing unit configured to multiplex the luminance signal and the chrominance signal; and a first memory configured to temporarily store the multiplexed signal. The temporarily-stored multiplexed signal may be output by the MAC module in synchronization with a transmission clock signal of the PHY module.

The Ethernet-based image transmitting device may further include a compression unit configured to compress the luminance signal and the chrominance signal if a bandwidth of the multiplexed signal exceeds an Ethernet transmission bandwidth according to an image resolution. The control unit may be configured to generate the multiplexed signal in a unit of a line, and insert the synchronization information in a line of the multiplexed signal.

The MAC module may insert a line number of the multiplexed signal into the packet.

Image resolution information may be inserted into the multiplexed signal or the packet.

The control unit may further include a second memory configured to temporarily store a control signal received in synchronization with the transmission clock signal of the PHY module via the Ethernet cable and then output the control signal in synchronization with an internal clock signal.

The Ethernet cable may be an unshielded twisted pair (UTP) cable or an optical fiber cable.

According to an aspect of another exemplary embodiment, there is provided an Ethernet-based image receiving device including: a physical (PHY) module configured to receive a packet comprising at least one multiplexed signal which has synchronization information and is obtained by multiplexing a digital signal comprising a luminance signal and a chrominance signal, via an Ethernet cable; a medium access control (MAC) module configured to extract the multiplexed signal from the packet; and a control unit configured to separate the luminance signal and the chrominance signal from the multiplexed signal, store the luminance signal and the chrominance signal, and output the luminance signal and the chrominance signal by synchronizing lines with each other based on the synchronization information.

The control unit may include: a third memory configured to temporarily store the multiplexed signal received in synchronization with a reception clock signal of the PHY module and then output the multiplexed signal in synchronization with an internal clock signal; a demultiplexing unit configured to demultiplexed the multiplexed signal into the luminance signal and the chrominance signal; a frame memory configured to store the luminance signal and the chrominance signal in units of lines; and a synchronization signal generation unit configured to generate a vertical synchronization signal and a horizontal synchronization signal based on the synchronization information so that the luminance signal and the chrominance signal stored in the frame memory are output by synchronizing lines with each other.

The demultiplexing unit may separate a control signal from the multiplexed signal.

The frame memory may store the luminance signal and the chrominance signal in a corresponding line region based on a line number included in the packet.

The control unit may further include a fourth memory which temporarily stores a control signal received from an external source and outputs the control signal in synchronization with the reception clock signal.

The Ethernet-based image receiving device may further include a restoration unit which performs decompression when the luminance signal and the chrominance signal are compressed signals.

The Ethernet cable may be a UTP cable or an optical fiber cable.

According to an aspect of still another exemplary embodiment, there is provided an Ethernet-based image transmitting/receiving system including: a digital image transmitting device configured to transform an analog image signal received from an image sensor into a digital signal including a luminance signal and a chrominance signal, multiplex the luminance signal and the chrominance signal to generate a multiplexed signal having synchronization information, and generate and transmit a packet including at least one multiplexed signal; a digital image receiving device configured to receive the packet, extracts the multiplexed signal from the packet, separate the luminance signal and the chrominance signal from the multiplexed signal, store the luminance signal and the chrominance signal, and output the luminance signal and the chrominance signal by synchronizing lines with each other based on the synchronization information; and an Ethernet cable configured to connect the digital image transmitting device to the digital image receiving device and transmit the packet.

The image transmitting device may be configured to temporarily store the multiplexed signal and then output the multiplexed signal in synchronization with a transmission clock signal of a packet transmission module. The image receiving device may be configured to temporarily store the multiplexed signal received in synchronization with a reception clock signal of a packet reception module and then output the multiplexed signal in synchronization with an internal clock signal, and store the luminance signal and the chrominance signal separated from the multiplexed signal, in units of lines, and then output the luminance signal and the chrominance signal by synchronizing lines with each other based on the synchronization information.

The image transmitting device may include a compression unit which compresses the luminance signal and the chrominance signal when a bandwidth of the multiplexed signal exceeds an Ethernet transmission bandwidth according to an image resolution. The image receiving device may include a restoration unit which decompresses the compressed luminance signal and the compressed chrominance signal that are output by synchronizing lines with each other based on the synchronization information.

The image transmitting device may insert a line number of the multiplexed signal into the packet, and the digital image receiving device may store the luminance signal and the chrominance signal in a frame memory, based on the line number.

The Ethernet cable may be a UTP cable or an optical fiber cable.

According to the exemplary embodiments, long-distance transmission of an HD digital image signal may be accomplished at a low cost.

BRIEF DESCRIPTION OF THE DRAWINGS

The above and other aspects will become more apparent by describing in detail exemplary embodiments with reference to the attached drawings. in which:

FIG. 5 illustrates a code standard of the digital Y and C signals of FIGS. 4A and 4B;

DETAILED DESCRIPTION OF THE EXEMPLARY EMBODIMENTS

Hereinafter, exemplary embodiments will be described more fully with reference to the accompanying drawings. Expressions such as "at least one of," when preceding a list of elements, modify the entire list of elements and do not modify the individual elements of the list.

A high-definition serial digital interface (HD-SDI) transmission system transforms a parallel image signal (e.g., a Y/C signal) and a parallel audio signal into single-bit serial signals according to an HD-SDI standard and transmits the single-bit serial signals. In this case, since a frequency band starts from a low frequency and reaches about 1.5 Ghz, an expensive coaxial cable that is excellent in high-frequency attenuation is used. Accordingly, installation of the expensive coaxial cable may be difficult, for example, the installation is affected by a cable being bent or squashed, the cost for the installation may become expensive, and further, information may be transmitted only in one direction.

In contrast, a system for transmitting digital image/audio information and a control signal in parallel needs a plurality of signal lines that connect a transmitting device to a receiving device.

An image transmitting/receiving system and an image transmitting/receiving method according to exemplary embodiments of the present inventive concept are capable of accomplishing long-distance transmission of an image signal at low costs by using an unshielded twisted pair (UTP) cable, which is a low-priced standard Ethernet cable that is simple and widely used.

In addition, an image transmitting/receiving system and an image transmitting/receiving method according to the exemplary embodiments are capable of effectively reducing signal loss in poor radio environments by using an optical fiber cable as an Ethernet cable, and of accomplishing long-distance transmission of a large-capacity image signal.

Figure 1:
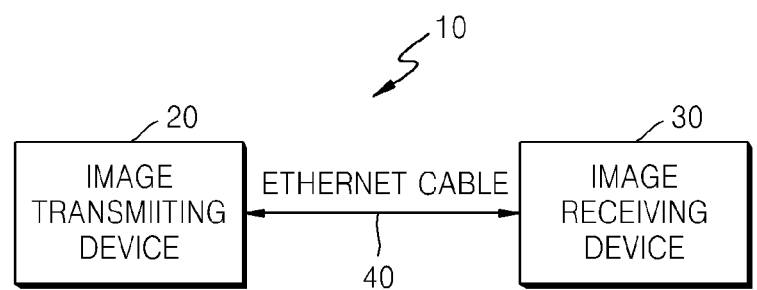
FIG. 1 is a block diagram of an Ethernet-based image transmitting/receiving system according to an exemplary embodiment.

FIG. 1 is a block diagram of an Ethernet-based image transmitting/receiving system 10 according to an exemplary embodiment.

The Ethernet-based image transmitting/receiving system 10 applies standard Ethernet transmission technology to transmit a digital image signal. To transmit a digital image signal, a transmission side multiplexes an image signal, which is a consecutive parallel digital signals, to transform the image signal into a packet type, and a reception side receives the image signal in units of packets. However, since Ethernet transmits data in an asynchronous manner, there is a difference between a transmission clock and a reception clock of the transmission side and the reception side that are connected to each other. Accordingly, clock synchronization occurs within a single packet, while jitter exists between packets. Accordingly, the Ethernet-based image transmitting/receiving system 10 according to the current exemplary embodiment stabilizes signal transmission by producing a stable reference line synchronization signal according to a composition of a picture and securing synchronization in units of image lines.

Referring to FIG. 1, the Ethernet-based image transmitting/receiving system 10 includes an image transmitting device 20, an image receiving device 30, and an Ethernet cable 40 through which data are transmitted and received between the image transmitting device 20 and the image receiving device 30.

The image transmitting device 20 may transform a received analog image signal into a digital signal including a digital luminance signal and a digital chrominance signal, may multiplex the digital luminance signal and the digital chrominance signal to generate a multiplexed signal, may generate a packet including at least one multiplexed signal, may transform the packet into an Ethernet transmission format, and may transmit the packet in an Ethernet transmission format via the Ethernet cable 40. The multiplexed signal may have synchronization information.

The image receiving device 30 may receive the packet via the Ethernet cable 40, may extract the multiplexed signal from the packet, and may separate the digital luminance signal and the digital chrominance signal from the multiplexed signal. The image receiving device 30 may store the digital luminance signal and the digital chrominance signal, and then, may output the digital luminance signal and the digital chrominance signal by synchronizing lines with each other based on the synchronization information.

The Ethernet cable 40 is an unshielded twisted pair (UTP) cable or an optical fiber cable, instead of an expensive coaxial cable, as a transmission medium. The Ethernet cable 40 supports a half duplex mode, or a full duplex mode in which bi-directional communication is possible. The 1000BASE-T or 10 GBASE-T PHY technology used in standard Ethernet transmission is applied to the UTP cable. The 1000BASE-T or 10 GBASE-T PHY technology is a technology standard associated with a next-generation physical layer that supports a transmission speed of 1 Gbps or 10 Gbps up to a maximum of 100 m by using a copper line. The 1000BASE-T PHY technology may stably transmit data at a speed of up to 1 Gbps at low costs, and the 10 GBASE-T PHY technology may stably transmit data at a speed of up to 10 Gbps at low costs, by using a UTP cable. Examples of the UTP cable include UTP Cat5, UTP Cat6, UTP Cat6A, and the like.

The optical fiber cable loses very little energy, and thus, provides a low loss rate of data to be transmitted and received, and is seldom affected by external interferences. Thus, the optical fiber cable enables an image signal to be stably transmitted at a minimum loss.

Figure 2:
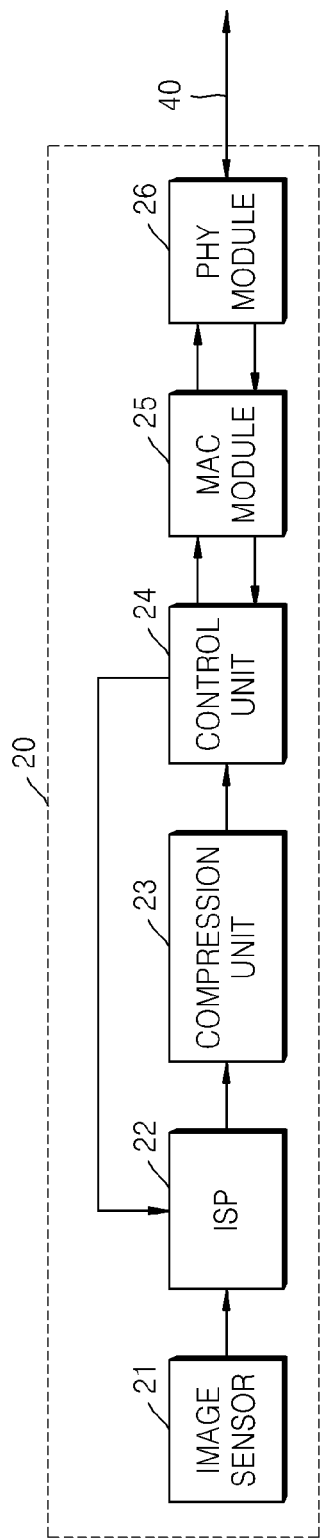
FIG. 2 is a block diagram of an Ethernet-based image transmitting device according to an exemplary embodiment.

FIG. 2 is a block diagram of an Ethernet-based image transmitting device 20 according to an exemplary embodiment.

Examples of the image transmitting device 20 may include various digital image processing apparatuses, such as a monitoring camera and a robot which perform digital image processing. The image transmitting device 20 includes an image sensor 21, an image signal processor (ISP) 22, a compression unit 23, a control unit 24, a medium access control (MAC) module 25 and a physical (PHY) module 26.

The image sensor 21 is a photoelectric transformation unit including an imaging device such as a charge-coupled device (CCD) or a complementary metal-oxide-semiconductor (CMOS). The image sensor 21 transforms light received from an optical unit into an electrical analog signal.

The ISP 22 transforms the electrical analog signal obtained by the image sensor 21 into a parallel digital image signal including a luminance signal (hereinafter, referred to as a Y signal) and a chrominance signal (hereinafter, referred to as a C signal). The digital Y signal and the digital C signal have synchronization information. The ISP 22 may receive a control signal from the control unit 24 and process the control signal. The control signal may control an image signal.

The compression unit 23 compresses the digital Y signal and the digital C signal, when a bandwidth of a multiplexed signal exceeds an Ethernet transmission bandwidth according to an image resolution.

When the amount of data of an image signal to be transmitted according to an image resolution exceeds a maximum transmission capacity of an Ethernet, the compression unit 23 compresses the image signal to accomplish Ethernet transmission. In other words, the compression unit 23 may be used or may not be used, according to an image resolution, namely, the number of pixels of the image sensor 21. For example, in Gigabit Ethernet having a maximum transmission capacity of 1 Gbits/s, when the amount of data of an image signal to be transmitted exceeds 1 Gbits/s, the compression unit 23 compresses the image signal.

The compression unit 23 may compress the image signal according to lossless compression or at least one of differential pulse code modulation (DPCM) compression and compression based on sub-sampling ratio control. The compression is simple and may minimize signal loss (i.e., not affect the quality of an image) and enable full-HD images to be efficiently transmitted, compared to compression/coding, such as JPEG/MPEG. DPCM compression and compression based on sub-sampling ratio control are simple in terms of a compressing method and may contribute to cost saving, compared to lossless compression.

For example, in the case of SD images, 10 bits are allocated to form a Y signal, 10 bits are allocated to form a C signal, and SD images have a 720×480 resolution, a structure of a 30 fps frame rate, and a sampling frequency of 13.5 Mhz. Accordingly, when an image signal (i.e., a Y signal and a C signal) is multiplexed to 8 bits, it has a size of 270 Mbits/s, and thus, may be sufficiently processed in a transferable band of 1 Gbits/s. Therefore, image signal compression by the compression unit 23 is not needed.

On the other hand, in the case of full-HD images, 10 bits are allocated to form a Y signal, 10 bits are allocated to form a C signal, and full-HD images have a 1920×1080 resolution, a structure of a 30 fps frame rate, and a sampling frequency of 74.5 Mhz. Accordingly, when an image signal (i.e., a Y signal and a C signal) is multiplexed to 8 bits, it has a size of 1.4 Gbits/s, and thus, exceeds the transferable band of 1 Gbits/s. Therefore, image signal compression by the compression unit 23 is necessary.

In an example of compression, the compression unit 23 may be implemented by using a lossless codec that reduces a bandwidth of a signal to an extent that an effect of the reduction is not greatly recognized, to compress an image signal. Accordingly, the bandwidth of a signal which is to be transmitted may be compressed to ½ up to ⅙.

In another example, the compression unit 23 may compress an image signal by DPCM compression in which a differential value of a Y signal and a differential value of a C signal are coded. Accordingly, the bandwidth of a signal which is to be transmitted may be reduced by reducing the number of bits allocated to form each of the Y signal and the C signal to six (6) bits. A sub-sampling ratio of each of the Y signal and the C signal is maintained as 4:2:2.

In another example, the compression unit 23 may compress an image signal by performing sub-sampling on the Y signal and the C signal at a ratio of 4:1:1. Accordingly, the bandwidth of a signal which is to be transmitted may be reduced by reducing the number of bits allocated to form the C signal to four (4) bits while eight (8) bits are allocated to the Y signal.

In another example, the compression unit 23 may compress an image signal by performing DPCM compression and performing sub-sampling on the Y signal and the C signal at a ratio of 4:1:1. Accordingly, the bandwidth of a signal which is to be transmitted may be reduced by reducing the number of bits allocated to form the Y signal to six (6) bits and reducing the number of bits allocated to form the C signal to three (3) bits.

An image format, such as image resolution information (e.g., an SD resolution, a full-HD resolution, and the like), may be inserted into a multiplexed signal during multiplexing of an image signal, as described later, or into a packet during packet generation.

In the case of Ethernet communication based on an optical fiber cable, image signal transmission of 1 Gbps or more is possible, and thus, the compression unit 23 may not be included. However, when the transmission bandwidth of an optical fiber cable is restricted according to situations, the compression unit 23 may perform image compression according to the maximum transmission capacity of the optical fiber cable.

The control unit 24 multiplexes the Y signal and the C signal corresponding to one line that constitutes an image (hereinafter, referred to as an image line). The control unit 24 may also multiplex the control signal together with the image signal including the Y signal and the C signal. The control signal may be an audio signal received from an audio input device. The multiplexed signal has synchronization information. The control unit 24 temporarily stores the multiplexed signal which is a digital signal multiplexed in units of image lines (hereinafter, referred to as a multiplexed signal), and then, outputs the multiplexed signal according to a transmission clock signal of the PHY module 26. The control unit 24 may insert resolution information into the multiplexed signal. The MAC module 25 is a MAC layer module and generates a packet including at least one multiplexed signal. The MAC module 25 may insert a line number of the multiplexed signal into the packet. A method in which the MAC module 25 generates the packet will be described later.

The PHY module 26 may be designed differently depending on the type of Ethernet cable 40.

When the Ethernet cable 40 is a UTP cable, the PHY module 26 may transform a packet generated at the MAC module into a Ethernet standard signal having an Ethernet transmission format according to a Ethernet protocol, and transmit the Ethernet standard signal via the UTP cable (for example, a Cat5e Cable). For example, when 1000BASE-T PHY technology for transmitting a 4-Dimensional 5-level Pulse Amplitude Modulation (4D 5-PAM) signal at 125 Mbaud in both directions simultaneously by using four (4) pairs of UTP lines is used, the PHY module 26 transforms packet information, namely, an 8-bit multiplexed signal synchronized with a 125 MHz clock, into a 4D 5-PAM signal at 125 Mbaud by using a 4D Trellis-Coded Modulation (TCM) technique. The PHY module 26 may transmit data at 1 Gbps in a full duplex mode via the Ethernet cable 40 implemented by four (4) pairs of UTP lines.

When the Ethernet cable 40 is an optical fiber cable, the PHY module 26 transforms the packet received from the MAC module 25 into an optical signal without signal modulation and transmits the optical signal via the Ethernet cable 40 according to the Ethernet protocol. The PHY module 26 may transmit data in a half duplex mode during long-distance communication and may transmit data in a full duplex mode during short-distance communication. To this end, the PHY module 26 may include a switch capable of selecting an optical fiber cable for the half duplex mode or an optical fiber cable for the full duplex mode.

Figure 3:
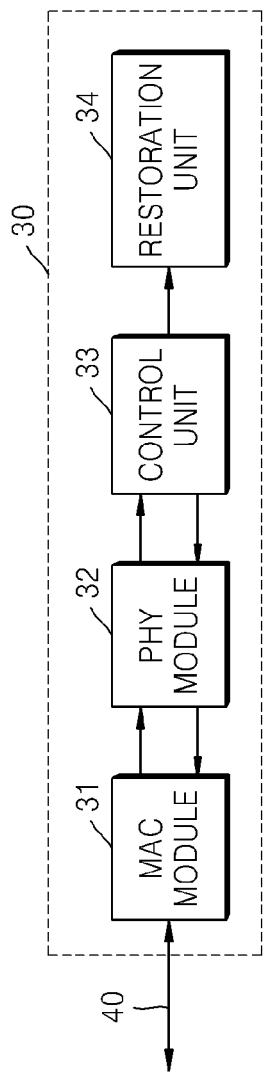
FIG. 3 is a block diagram of an Ethernet-based image receiving device according to an exemplary embodiment.

The ISP 22, the control unit 24, the MAC module 25, and the PHY module 26 may perform both a transformation for Ethernet-based signal transmission and an inverse transformation of a signal received via Ethernet. Accordingly, the image transmitting device 20 may inversely transform the audio signal and the control signal received from the image receiving device 30 via the PHY module 26, the MAC module 25, and the control unit 24. Linear distortion caused by frequency loss of copper lines, an echo signal returning from a hybrid circuit, a near-end cross talk (NEXT) due to a short-distance transmission signal, and a far-end cross talk due to a long-distance transmission signal may be added to the control signal received via the Ethernet cable 40. Accordingly, an inversely transformed control signal, which is a result of the inverse transformation, may be processed by, for example, an equalizer, a NEXT remover, and an echo remover. Settings and operations of the image transmitting device 20 may be controlled by the inversely transformed control signal. FIG. 3 is a block diagram of an Ethernet-based image receiving device 30 according to an exemplary embodiment. Examples of the image receiving device 30 may include a digital video recorder (DVR), a network video recorder (NVR), a image display device, a image switching device, and a computer, which are widely used as a closed-circuit TV (CCTV) system. The image receiving device 30 includes a PHY module 31, a MAC module 32, a control unit 33, and a restoration unit 34.

The PHY module 31 transforms a signal received in an Ethernet transmission format via the Ethernet cable 40 into a preset packet. The PHY module 31 transforms a received signal into a packet according to a process inverse to the process of transforming a packet into an Ethernet transmission format in the PHY module 26 of the image transmitting device 20. The packet includes at least one multiplexed signal that has synchronization information and is obtained by multiplexing a digital signal including a luminance signal and a chrominance signal.

The PHY module 31 may be designed differently depending on the type of Ethernet cable 40.

When the Ethernet cable 40 is a UTP cable, the PHY module 31 may transform a signal received via the UTP cable into a packet type. When the Ethernet cable 40 is an optical fiber cable, the PHY module 31 may transform an optical signal received via the optical fiber cable into a packet type.

The MAC module 32 is a MAC layer module that extracts the multiplexed signal from the packet. The multiplexed signal includes an image signal (i.e., a Y signal and a C signal)

and a control signal. The control signal may include an audio signal. The MAC module 32 may perform an error inspection on the received packet and recover an error of the packet or discard the packet having an error.

The control unit 33 may separate the Y signal, the C signal, and the control signal by demultiplexing the multiplexed signal, store the Y signal and the C signal in a frame memory (not shown), and output the Y signal and the C signal synchronously based on the synchronization information of the multiplexed signal.

The restoration unit 34 decompresses the image signal (i.e., the Y signal and the C signal) and the control signal, and may be included or used as occasion demands. When the image signal and the control signal are compressed signals (for example, signals compressed by lossless compression, DPCM compression, and/or compression based on sub-sampling ratio control), the restoration unit 34 may decompress the image signal and the control signal.

The PHY module 31, the MAC module 32, and the control unit 33 may perform both an inverse transformation of a signal received via Ethernet and a transformation for Ethernet-based signal transmission. Accordingly, the image receiving device 30 may transform an audio signal and a control signal to be transmitted to the image transmitting device 20 via the control unit 33, the MAC module 32, and the PHY module 31. The image receiving device 30 may remotely control settings and operations of the image transmitting device 20 according to the audio signal and/or the control signal.

Linear distortion caused by frequency loss of copper lines, an echo signal returning from a hybrid circuit, and a NEXT due to a short-distance transmission signal, and a far-end cross talk due to a long-distance transmission signal may be added to the image signal and the audio signal received via the Ethernet cable 40. Accordingly, the image receiving device 30 may process a transformed image signal and a transformed audio signal, which are results of the transformation, by using, for example, an equalizer, a NEXT remover, and an echo remover.

Although not illustrated in FIG. 3, the image receiving device 30 may further include a network communication unit, a multiplexer (MUX) & codec, and a storage that are controlled by a special control unit. The image receiving device 30 may digitally compress the image signal and the audio signal via the MUX & codec, store digitally-compressed image and audio signals, and reproduce the digitally-compressed image and audio signals. The image receiving device 30 may also transmit and receive the image and audio signals to and from an external terminal via the network communication unit.

Figure 4A:
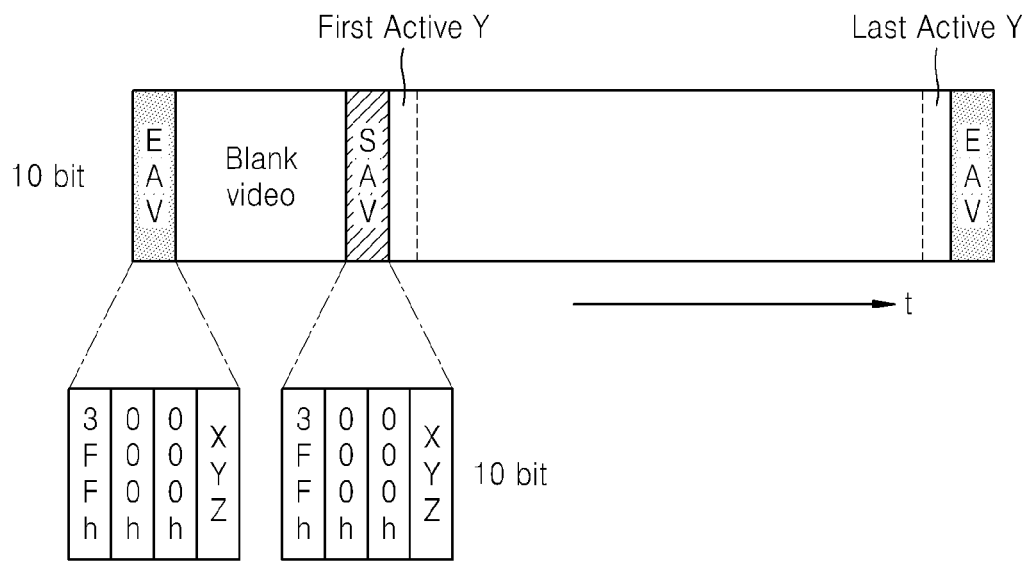
FIGS. 4A and 4B illustrate a digital Y signal and a digital C signal according to exemplary embodiments.
Figure 4B:
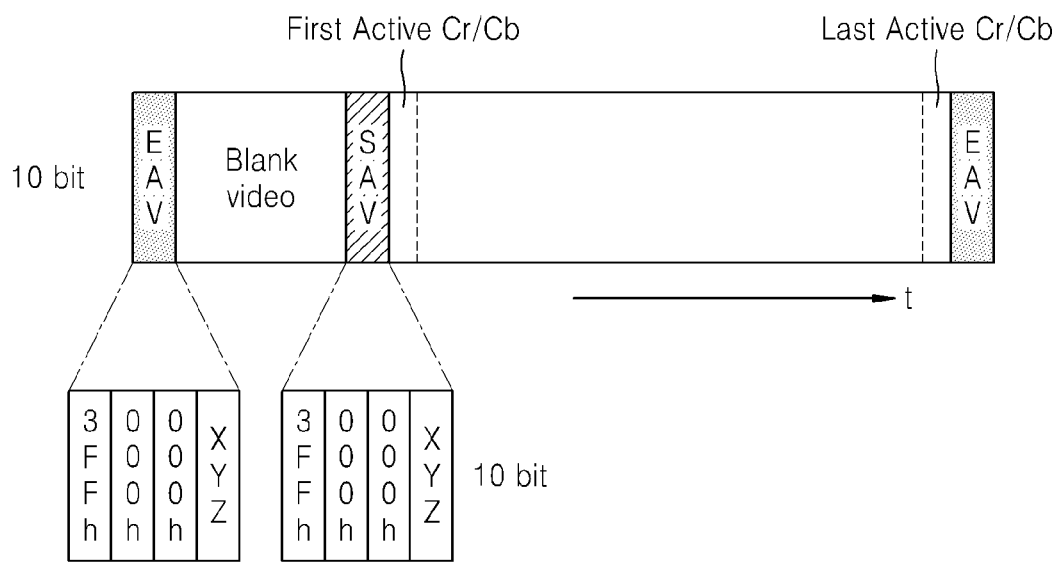

FIGS. 4A and 4B illustrate a digital Y signal and a digital C signal according to an exemplary embodiment.

Referring to FIG. 4A, a Y signal digitized to a predetermined number of bits is divided into a start of active video (SAV), a Y signal (active Y), an end of active video (EAV), and a blanking section (blank video). FIG. 2A illustrates a Y signal digitized to 10 bits.

Referring to FIG. 4B, a C signal digitized to a predetermined number of bits is divided into an SAV, a C signal (active Cr/Cb), an EAV, and a blank video. FIG. 2B illustrates a C signal digitized to 10 bits.

Referring to FIGS. 4A and 4B, each of the digital Y signal and the digital C signal includes an SAV and an EAV, which are digital picture synchronization signals, as synchronization information, at horizontal start and end positions, respectively. The SAV is a code indicating a start of horizontal synchronization, and the EAV is a code indicating an end of horizontal synchronization.

FIG. 5 illustrates a code standard of the digital Y and C signals of FIGS. 4A and 4B. Referring to FIGS. 4A, 4B, and 5, each of the SAV and the EAV includes four (4) words, three (3) words 3FF, 000 and 000 from among the four words are fixed preambles, and a fourth word XYZ includes status bits of F, V, and H, which represent horizontal synchronization, vertical synchronization, and field/frame information, to represent information about a current image signal.

The status bit F is field information. When an image display mode is a progressive mode, the status bit F is 0. When an image display mode is an interlaced mode and the status bit F is 0, it represents an even field. When an image display mode is an interlaced mode and the status bit F is 1, it represents an odd field.

The status bit V represents a vertical blanking section, namely, a field/frame blanking section. When the status bit V is 0, it represents an active section (i.e., a multiplexed signal section). When the status bit V is 1, it represents a vertical blanking section.

The status bit H represents a horizontal blanking section, namely, a line blanking section. When the status bit H is 0, it represents an active section (i.e., a multiplexed signal section). When the status bit H is 1, it represents a horizontal blanking section.

Values P0, P1, P2, and P3 of protection bits are determined according to the values of the status bits F, V, and H.

Figure 6A:
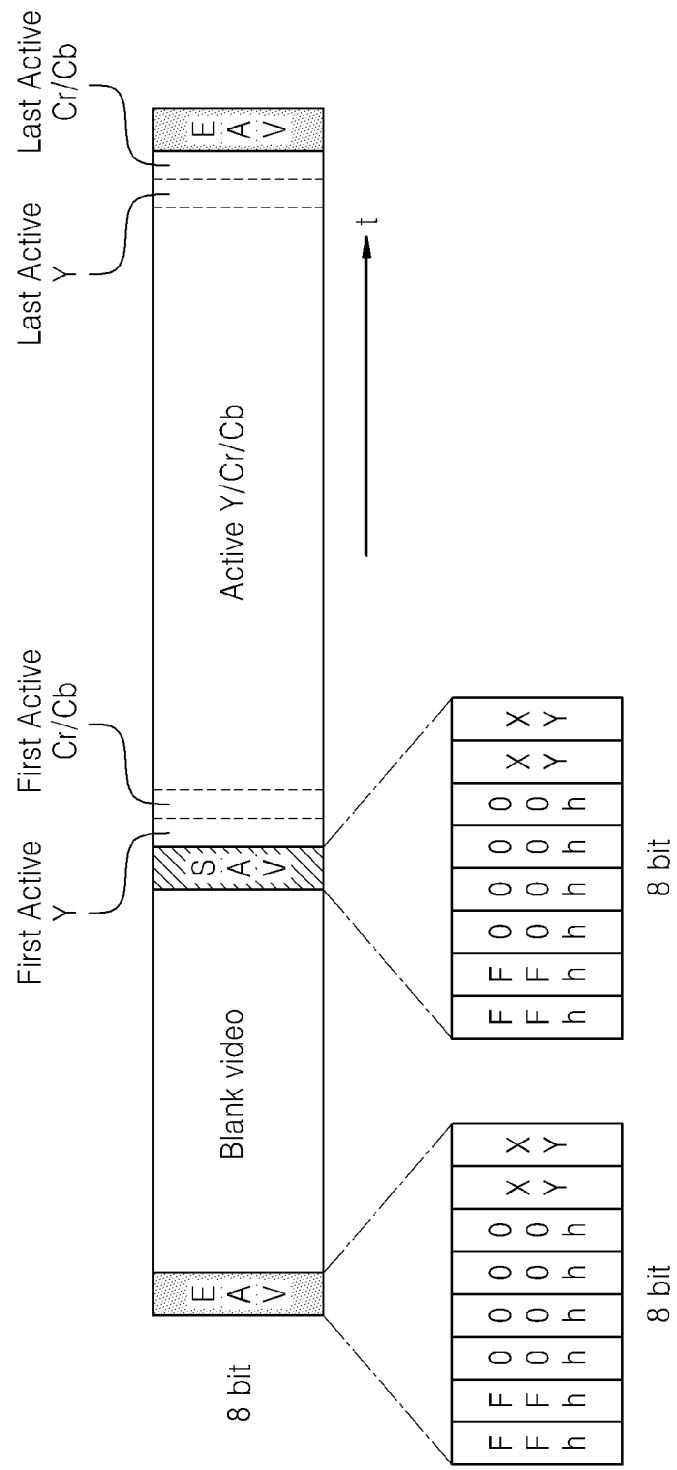
FIGS. 6A and 6B illustrate formats of a multiplexed signal according to exemplary embodiments.
Figure 6B:
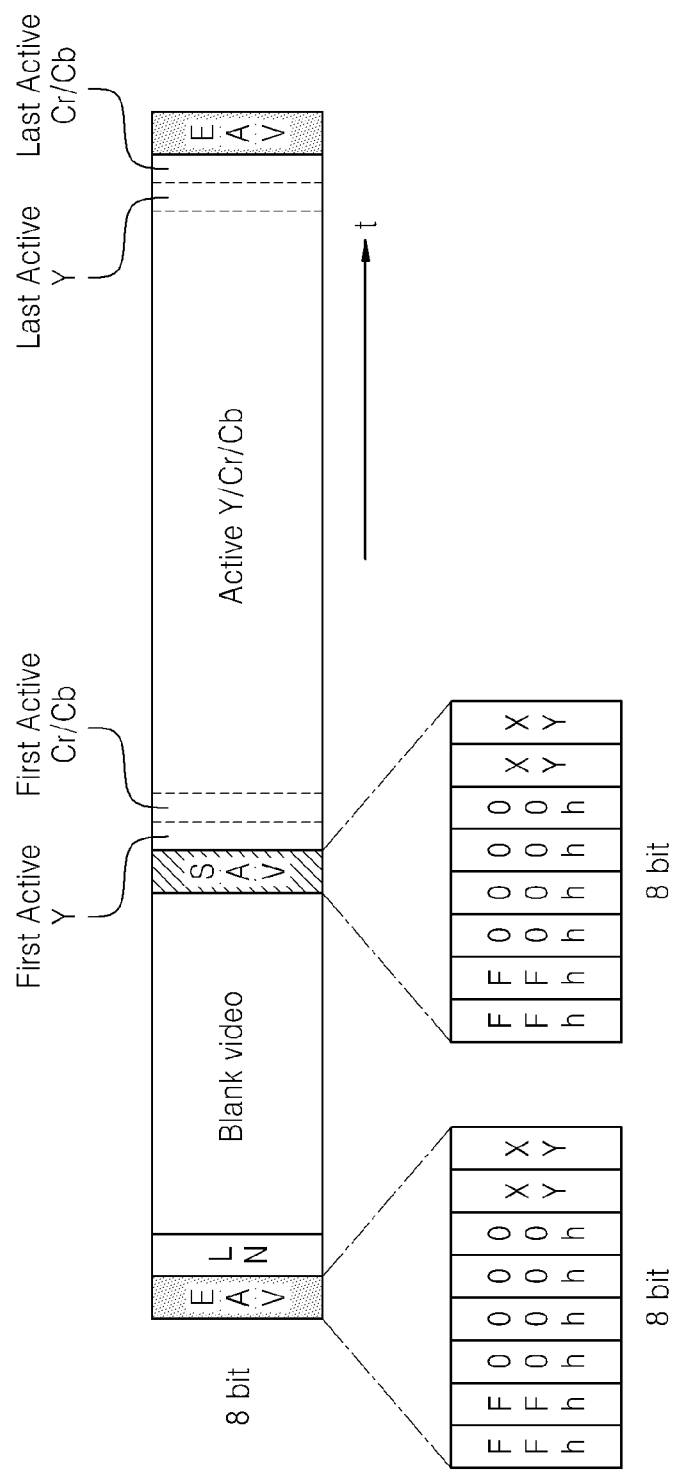

FIGS. 6A and 6B illustrate formats of multiplexed signals according to an exemplary embodiment. The formats of the multiplexed signal are each divided into an SAV, a multiplexed signal (active Y/Cr/Cb), an EAV, and a blank video. FIGS. 6A and 6B illustrate multiplexed signals obtained by multiplexing a 10-bit Y signal and a 10-bit C signal into eight (8) bits. When the Y signal and the C signal are compressed, multiplexing bits may be changed. Similar to the Y signal and the C signal, the multiplexed signal includes an SAV and an EAV, which are digital video synchronization signals, at a start position and an end position, respectively, of each horizontal line (i.e., each image line). The SAV indicates a start of horizontal synchronization, and the EAV indicates an end of horizontal synchronization. Referring to FIG. 6B, an image line number LN may be inserted behind an EAV in the multiplexed signal.

The code standard of FIG. 5 may be used as code standards of the multiplexed signals of FIGS. 6A and 6B.

Figure 6C:
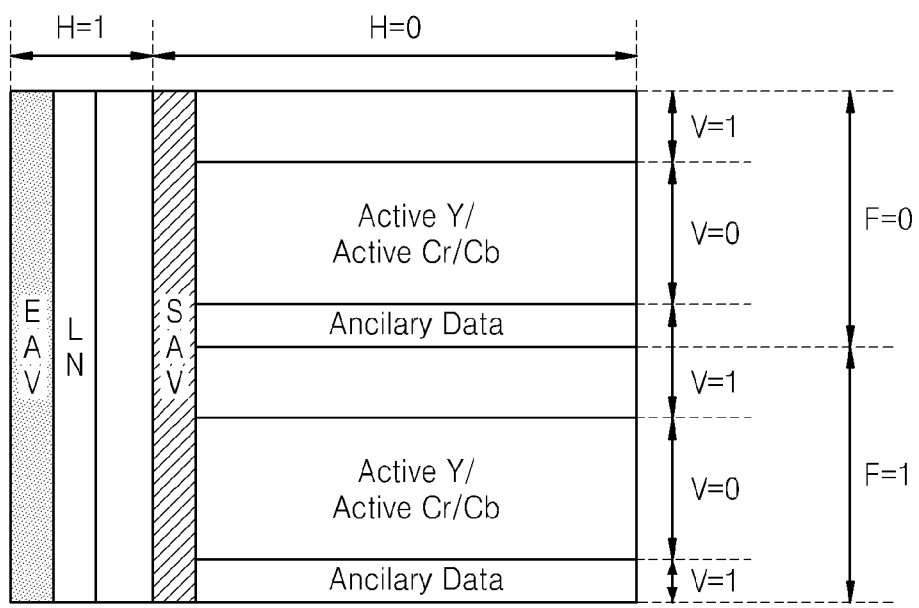
FIG. 6C illustrates a timing standard of a multiplexed signal according to an exemplary embodiment.

FIG. 6C illustrates a timing standard of a multiplexed signal according to an exemplary embodiment. Through a bit allocation history of a fourth word of each of an SAV and an EAV, it is possible to represent each location of the timing standard defined in FIG. 6C, and thus, a spatial layout of fields/frames may be expressed. Ancillary data may include an audio signal and a control signal, except for an image signal. Although FIG. 6C illustrates an example in which an image line number LN is inserted, the image line number LN may be omitted.

Referring to FIG. 6C, status bits F of all lines in a progressive mode are 0, a status bit F of an even field line in an interlaced mode is 0, and a status bit F of an odd field line in the interlaced mode is 1. A status bit H repeats 0 and 1 for each line, a status bit V of each line of the multiplexed signal is 1, and status bits V of a blanking section and an ancillary data section are 0.

FIGS. 7A through 7D illustrate structures of packets according to an exemplary embodiment.

Figure 7A:
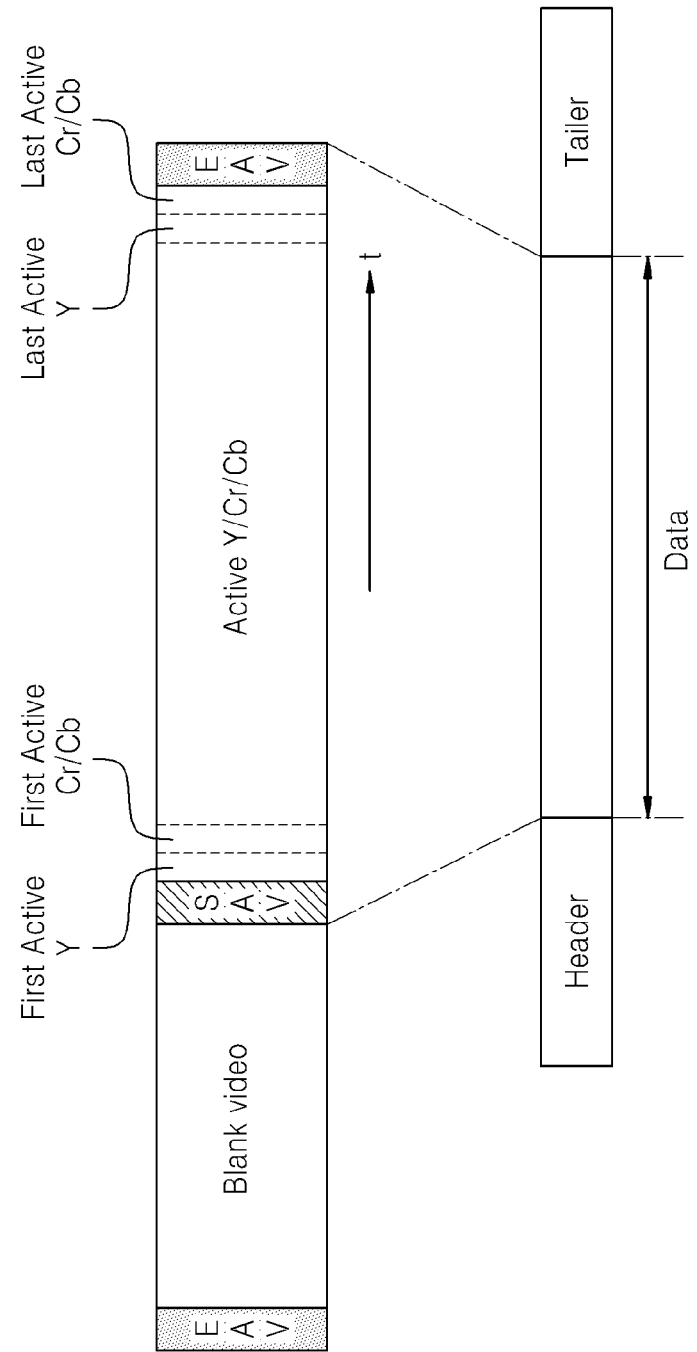
FIGS. 7A through 7D illustrate structures of packets according to exemplary embodiments.
Figure 7B:
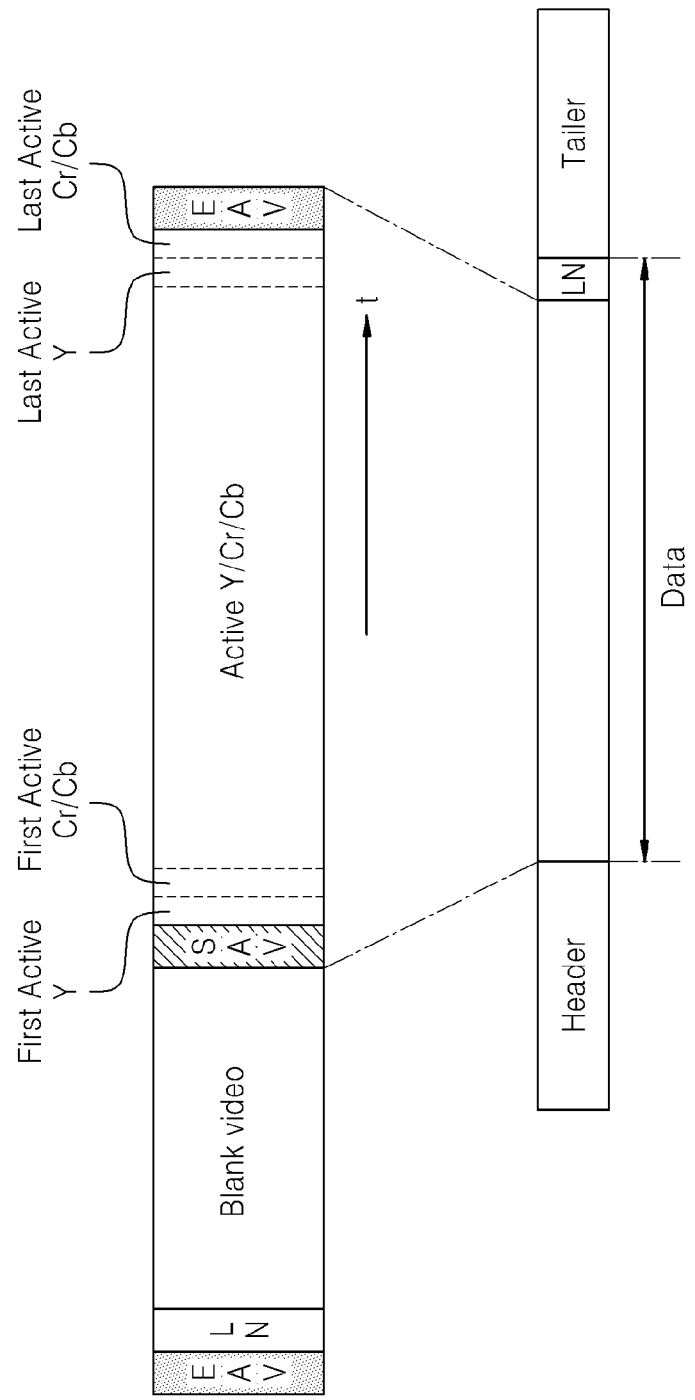

FIGS. 7A and 7B illustrate structures of packets each including a single multiplexed signal. Referring to FIG. 7A, the MAC module 25 may include a single piece of image line information in one packet by inserting a single multiplexed signal into a data region of the packet. A header and a trailer are inserted in front of and at the rear of the multiplexed signal, respectively. The header may represent a preamble, a start of frame delimiter (SFD), a destination address, a source address, an upper layer protocol type, and the like. The trailer may represent, for example, a frame check sequence (FCS) for error detection of a frame. Information inserted into a header and a trailer that constitute a packet according to the exemplary embodiment is not particularly limited. For example, information other than the aforementioned information may be further included in the header and the trailer. When a transmitting device and a receiving device are connected to each other via a single cable in a one-to-one correspondence, the header may not include the destination address and the source address.

The packet of FIG. 7B is the same as that of FIG. 7A except that an image line number LN is inserted into the packet, so a repeated description thereof is omitted. Referring to FIG. 7B, the MAC module 25 may insert a single multiplexed signal into a data region of a packet and insert an image line number LN at the end of the multiplexed signal.

Figure 7C:
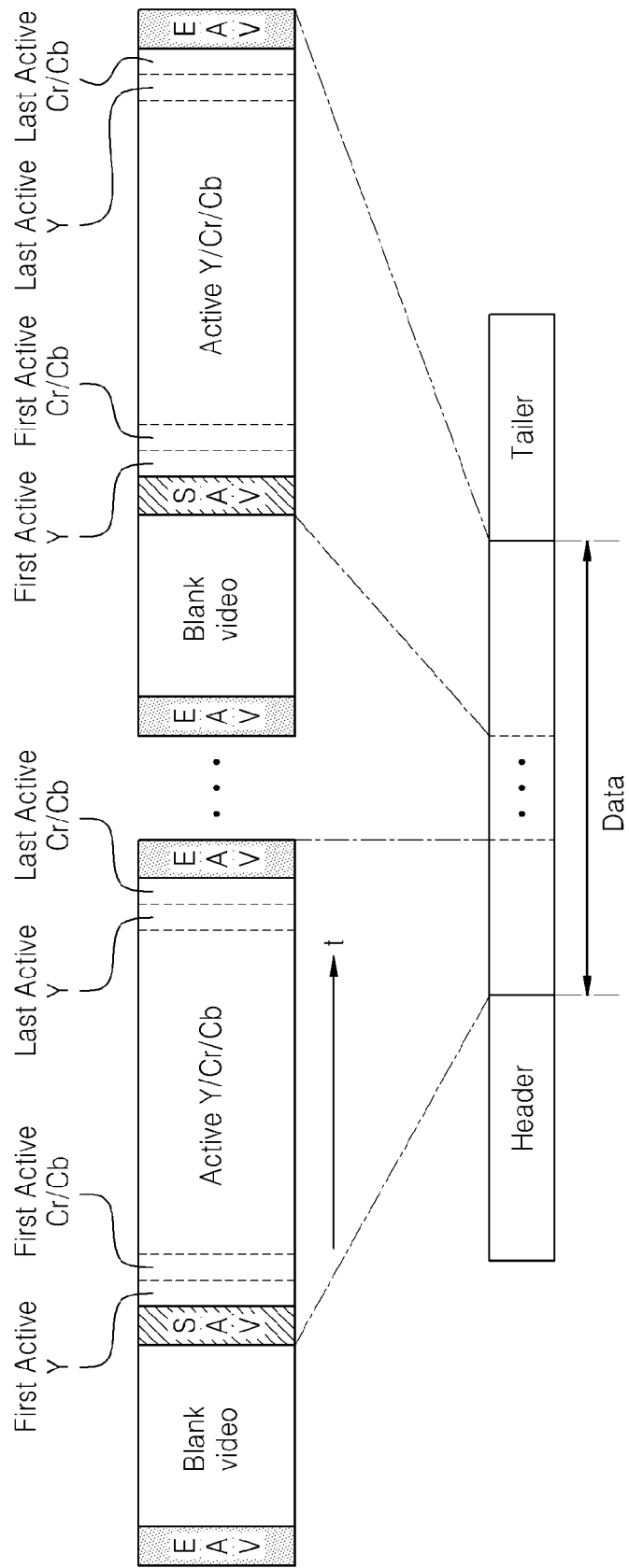
Figure 7D:
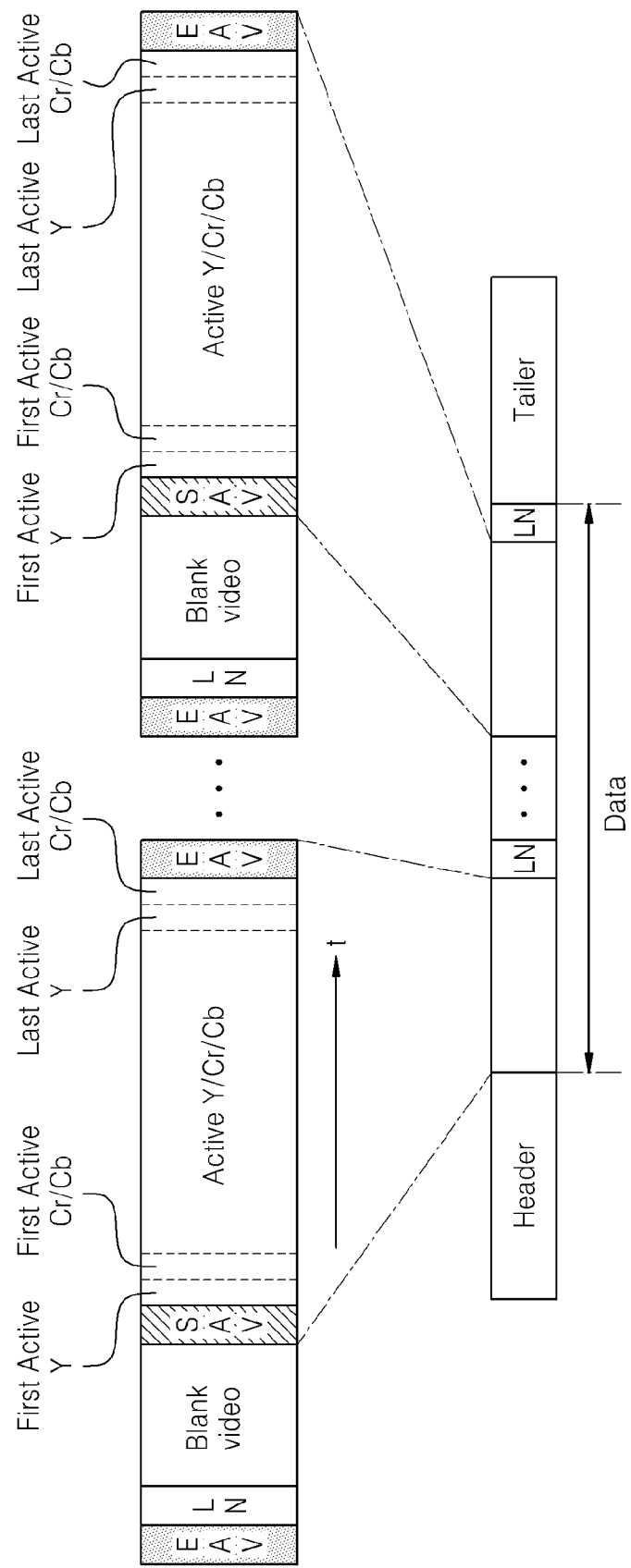

FIGS. 7C and 7D illustrate structures of packets each including a plurality of multiplexed signals. Referring to FIG. 7C, the MAC module 25 may include a plurality of pieces of image line information in one packet by inserting a plurality of multiplexed signals into a data region of the packet. The number of multiplexed signals included in a packet may be determined according to a size (i.e., a data amount) of a multiplexed signal and a transmission band of a transmission medium. A header and a trailer are inserted in front of and at the rear of the multiplexed signal, respectively. The header may represent a preamble, an SFD, a destination address, a source address, an upper layer protocol type, the number of multiplexed signals included, and the like. The trailer may represent, for example, an FCS for error detection of a frame. Information inserted into a header and a trailer that constitute a packet according to the exemplary embodiment is not particularly limited. For example, information other than the aforementioned information may be further included in the header and the trailer. When a transmitting device is connected to a receiving device via a single cable in a one-to-one correspondence, the header may not include the destination address and the source address.

The packet of FIG. 7D is the same as that of FIG. 7C except that an image line number LN is inserted into the packet, so a repeated description thereof is omitted. Referring to FIG. 7D, the MAC module 25 may insert a plurality of multiplexed signals into a data region of the packet and insert the image line number LN at the end of each of the multiplexed signals.

Figure 8:
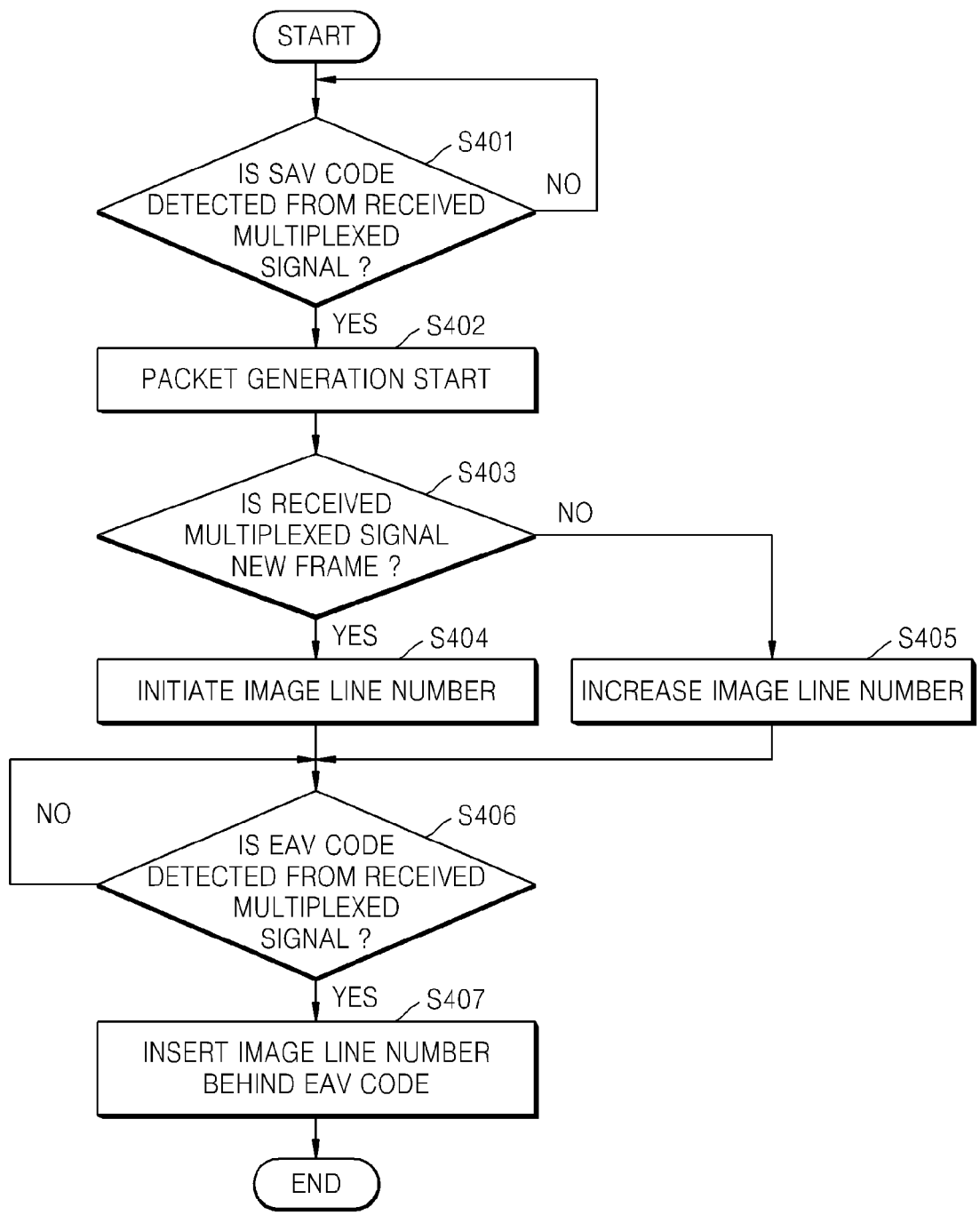
FIG. 8 is a flowchart of a packet generating method according to an exemplary embodiment.

FIG. 8 is a flowchart of a packet generating method performed in the image transmitting device 20, according to an exemplary embodiment.

Referring to FIG. 8, the MAC module 25 of the image transmitting device 20 determines whether an SAV code is detected from a received multiplexed signal, in operation S401. When the SAV code is detected, packet generation starts, in operation S402.

In operation S403, the MAC module 25 determines whether the received multiplexed signal is a new frame, by monitoring a change in frames. The MAC module 25 may determine whether the received multiplexed signal is a new frame, based on synchronization information of the multiplexed signal.

When insertion of an image line number is set, the MAC module 25 initiates the image line number if it is determined in operation S403 that the received multiplexed signal is a new frame, in operation S404, and increases the image line number if it is determined in operation S403 that the received multiplexed signal is not a new frame, in operation S405.

The MAC module 25 determines whether an EAV code is detected from the received multiplexed signal, in operation S406. If the EAV code is detected, the MAC module 25 completes the packet generation by generating a header and a trailer, each having necessary information, in front of and at the rear of the multiplexed signal, respectively. When insertion of an image line number is set, if the EAV code is detected, the MAC module 25 inserts the image line number behind the EAV code, in operation S407, and completes the packet generation by generating a header and a trailer, each having necessary information, in front of and at the rear of the multiplexed signal, respectively.

When the MAC module 25 wants to generate a packet including a predetermined number of multiplexed signals, operations S405 through S407 may be repeated on subsequent multiplexed signals.

Figure 9:
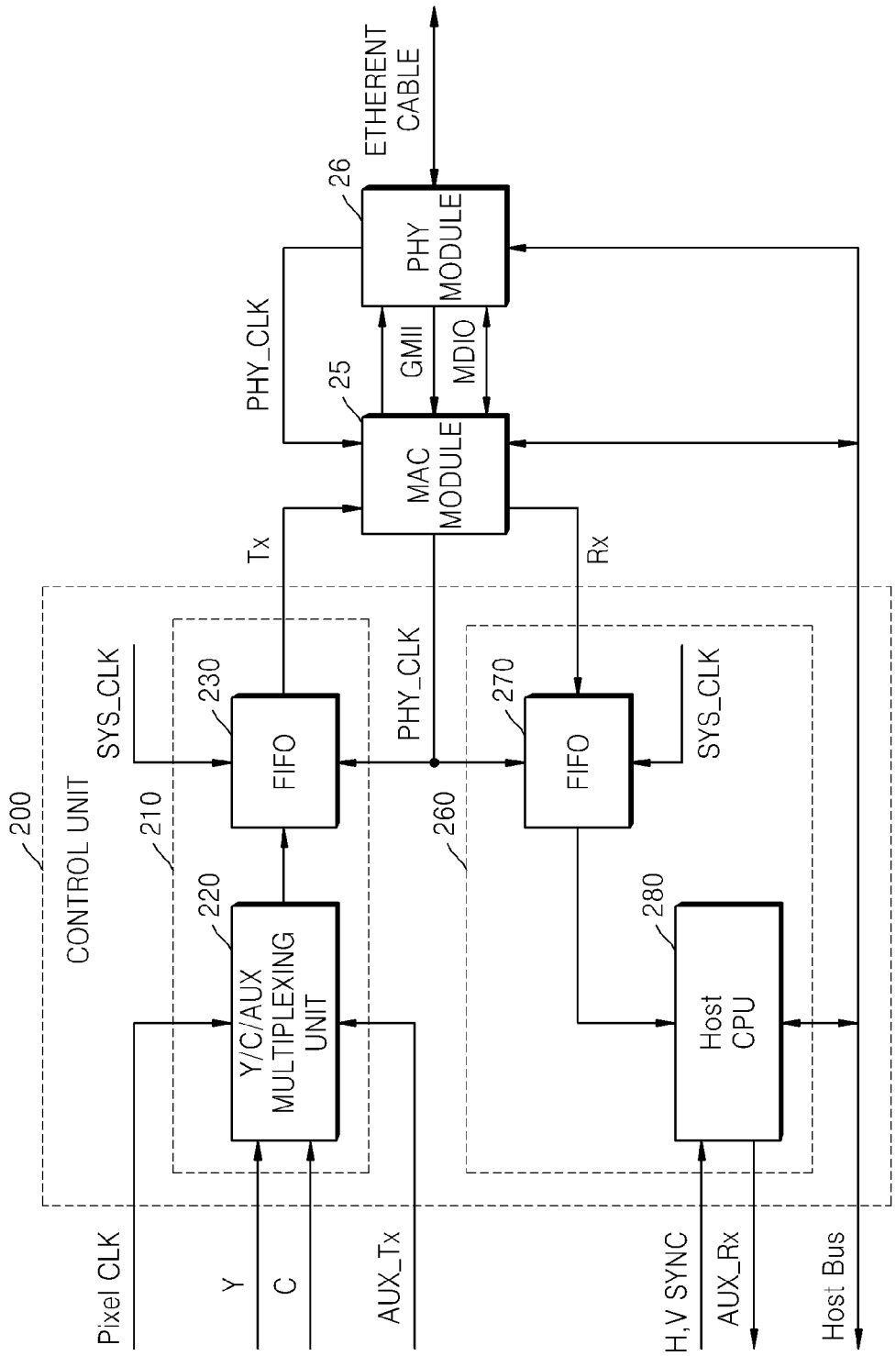
FIG. 9 is a block diagram of a control unit of an image transmitting device, according to an exemplary embodiment.

FIG. 9 is a block diagram of a control unit 200 of an image transmitting device, according to an exemplary embodiment.

The control unit 200 may function as the control unit 24 of the image transmitting device 20 of FIGS. 1 and 2 according to software and/or hardware structures. Referring to FIG. 9, the control unit 200 may include a first transmission control unit 210 and a first reception control unit 260.

The first transmission control unit 210 receives a digital image signal including a Y signal and a C signal, and an audio signal AUX_Tx obtained by an audio input device (i.e., an audio signal or a control signal received together with an image signal), and outputs the digital image signal and the audio signal AUX_Tx to the MAC module 25. The digital image signal (i.e., the Y signal and the C signal) may be a signal compressed to conform to a transmission band of a transmission medium. The audio signal AUX_Tx may be a signal compressed by adaptive DPCM (ADPCM). The first transmission control unit 210 may include a multiplexing unit 220 and a first memory 230.

The multiplexing unit 220 multiplexes the digital image signal (i.e., the Y signal and the C signal) and the audio signal AUX_Tx according to a pixel clock signal Pixel_CLK to generate a multiplexed signal, and outputs the multiplexed signal to the first memory 230. The multiplexing may be performed in units of image lines. The multiplexed signal output by the multiplexing unit 220 includes synchronization information. The multiplexing unit 220 may further include image resolution information (for example, information representing an SD resolution, an HD resolution, a full-HD resolution, and the like) in addition to the synchronization information, in the multiplexed signal. The multiplexing unit 220 outputs (records) the multiplexed signal to (in) the first memory 230 in synchronization with an internal system clock signal SYS_CLK, which is an image signal clock.

The first memory 230 temporarily stores the multiplexed signal in synchronization with the internal system clock signal SYS_CLK. The first memory 230 may be a first input first output (FIFO) memory.

The MAC module 25 receives a transmission clock signal PHY_CLK from the PHY module 26, and reads the multiplexed signal from the first memory 230 according to the transmission clock signal PHY_CLK to generate a packet. The MAC module 25 may generate a packet including at least one multiplexed signal. The MAC module 25 may include image resolution information (for example, information representing an SD resolution, an HD resolution, a full-HD resolution, and the like) in a header or a data region of the packet.

The multiplexed signal is stored in the first memory 230 in synchronization with the internal system clock signal SYS_CLK. In other words, the multiplexed signal is not synchronized with the MAC module 25 and the PHY module 26, which are based on Ethernet. Accordingly, the MAC module 25 reads the multiplexed signal from the first memory 230 in synchronization with the transmission clock signal PHY_CLK. The multiplexed signal is inserted into an Ethernet packet in the MAC module 25 and transmitted to the PHY module 26.

The first reception control unit 260 may receive a control signal from the image receiving device 30 via the PHY module 26 and the MAC module 25 and output the control signal. The first reception control unit 260 may include a second memory 270 and a host central processing unit (CPU) 280.

The second memory 270 temporarily stores the control signal output by the MAC module 25, in synchronization with the transmission clock signal PHY_CLK. The second memory 270 may be a FIFO memory. The control signal is output from the second memory 270 in synchronization with the internal system clock signal SYS_CLK.

The host CPU 280 receives a vertical synchronization signal V_SYNC and a horizontal synchronization signal H_SYNC and outputs the control signal in synchronization with the vertical synchronization signal V_SYNC and the horizontal synchronization signal H_SYNC. The control signal may be an audio signal AUX_Rx. The host CPU 280 may communicate with the PHY module 26 and the MAC module 25 via a host bus.

The PHY module 26 may transmit and receive a signal to and from the MAC module 25 according to a gigabit media independent interface (GMII) signal that supports the half duplex mode and the full duplex mode and a management data input/output (MDIO) signal.

Figure 10:
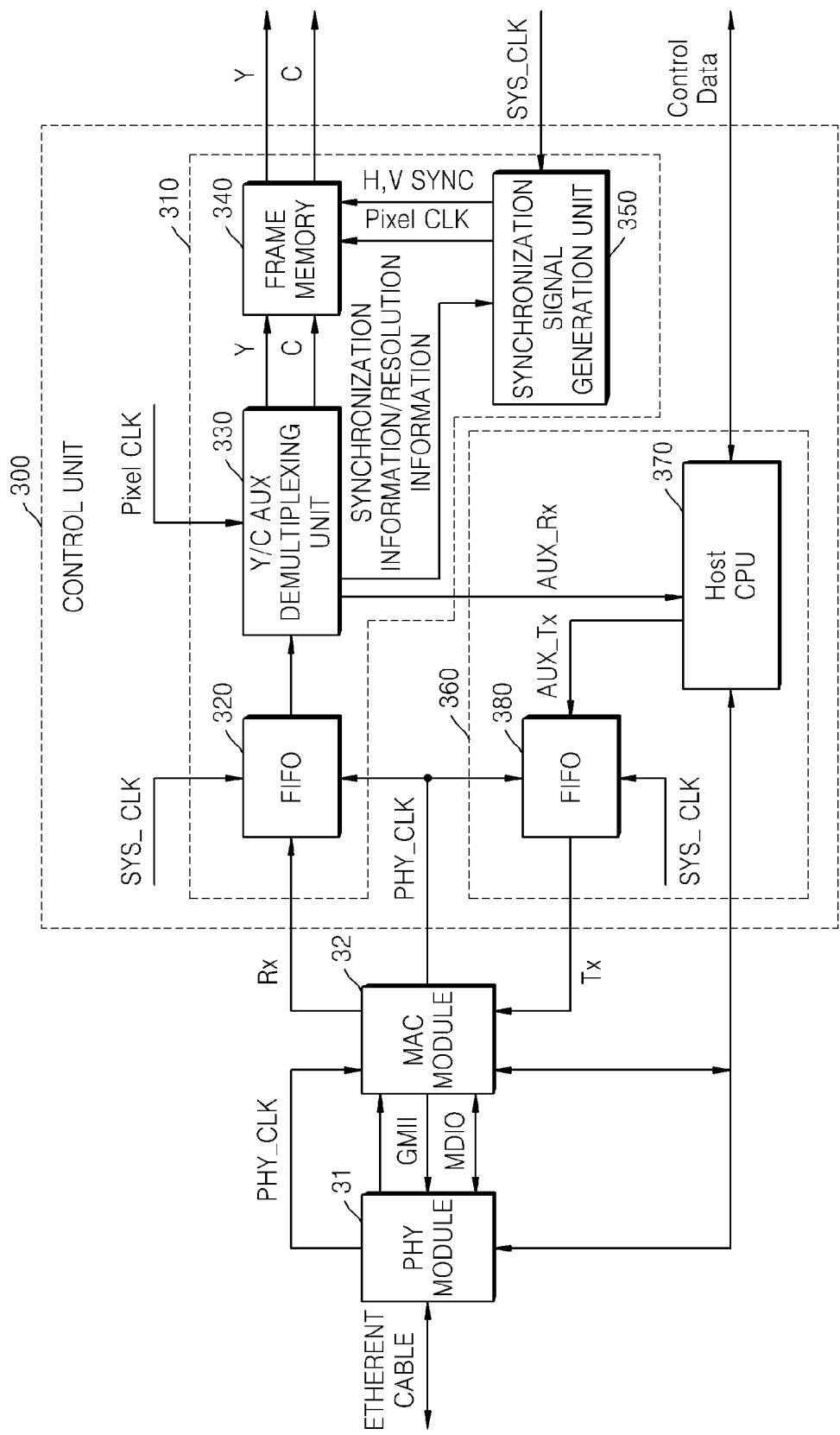
FIG. 10 is a block diagram of a control unit of an image receiving device, according to an exemplary embodiment.

FIG. 10 is a block diagram of a control unit 300 of an image receiving device, according to an exemplary embodiment.

The control unit 300 may function as the control unit 33 of the image receiving device 30 of FIGS. 1 and 3 according to software and/or hardware structures. Referring to FIG. 10, the control unit 300 may include a second reception control unit 310 and a second transmission control unit 360.

The PHY module 31 may transmit and receive a signal to and from the MAC module 32 according to a GMII signal that supports the half duplex mode and the full duplex mode and an MDIO signal.

The second reception control unit 310 may receive a multiplexed signal from the image transmitting device 20 via the PHY module 31 and the MAC module 32 and output the multiplexed signal. The second reception control unit 310 may include a third memory 320, a demultiplexing unit 330, a frame memory 340, and a synchronization signal generation unit 350.

The MAC module 32 receives a packet from the PHY module 31 in synchronization with a reception clock signal PHY_CLK, and extracts synchronization information, resolution information, and the multiplexed signal from the packet. When the packet includes an image line number, the MAC module 32 may also extract the image line number from the packet. The MAC module 32 transmits the multiplexed signal (i.e., a Y/C signal and a control signal) to the third memory 320 so that the multiplexed signal is stored (recorded) in the third memory 320 in synchronization with the reception clock signal PHY_CLK. When the packet includes an image line number, the MAC module 32 may also store the image line number in the third memory 320.

The third memory 320 temporarily stores the multiplexed signal (i.e., a Y/C signal and a control signal) received from the MAC module 32 in synchronization with the reception clock signal PHY_CLK. The third memory 320 may be a FIFO memory. The multiplexed signal is output from the third memory 320 in synchronization with the internal system clock signal SYS_CLK.

The demultiplexing unit 330 reads the multiplexed signal from the third memory 320 in synchronization with the internal system clock signal SYS_CLK. The demultiplexing unit 330 demultiplexes the multiplexed signal to separate the Y signal, the C signal, and the control signal AUX_Rx in synchronization with the pixel clock signal Pixel_CLK. The demultiplexing unit 330 outputs the control signal AUX_Rx, namely, the audio signal AUX_Rx, to the second transmission control unit 360 and outputs the Y signal and the C signal to the frame memory 340. The demultiplexing unit 330 outputs the synchronization information and the resolution information to the synchronization signal generation unit 350.

The demultiplexing unit 330 may predict an image line number by counting the start of a frame and the number of image lines based on the synchronization information. When the received multiplexed signal includes an image line number, the demultiplexing unit 330 may extract the image line number from the multiplexed signal and store (record) the Y signal and the C signal in a corresponding region of the frame memory 340 according to the image line number.

According to the present embodiment, when no image line numbers are included in the multiplexed signal, the demultiplexing unit 330 counts the number of image lines. However, the number of image lines may be counted by a special counter.

The frame memory 340 stores the Y signal and the C signal in synchronization with a pixel clock signal Pixel_CLK generated by the synchronization signal generation unit 350. The frame memory 340 may store a plurality of image line signals in a corresponding region. An image signal, namely, the Y signal and the C signal, stored in the frame memory 340 is output in synchronization with the horizontal and vertical synchronization signals H/V_SYNC generated by the synchronization signal generation unit 350. Accordingly, image distortion due to jitter between packets, namely, jitter between image lines, may be effectively prevented. The frame memory 340 may be implemented by a line memory or a frame memory to store an image signal of at least one image line.

On the other hand, when an image line number is included in the multiplexed signal, the frame memory 340 stores the image signal (i.e., the Y signal and the C signal) in a corresponding region according to the image line number. Accordingly, when an image signal of an n-th line of a current frame is discarded due to its loss or error, it may be replaced by an image signal of an n-th line of a previous frame previously stored in the corresponding region. In this case, when no image line numbers are included in the multiplexed signal and image signals are stored by counting or stored in the order in which they are received, in the frame memory 340, loss or disuse of an arbitrary image line is not recognized, and subsequent image signals are stored in wrong image line regions. Thus, the quality of an image may be degraded. The Y signal and the C signal output by the frame memory 340 may be reproduced or stored. When the Y signal and the C signal output by the frame memory 340 are compressed signals, they may be decompressed by the restoration unit 34 and then may be reproduced or stored.

The synchronization signal generation unit 350 receives the synchronization information and the resolution information from the demultiplexing unit 330, generates the pixel clock signal Pixel_CLK and the horizontal and vertical synchronization signals H/V_SYNC in synchronization with the internal system clock signal SYS_CLK based on the synchronization information and the resolution information, and outputs the pixel clock signal Pixel_CLK and the horizontal and vertical synchronization signals H/V_SYNC to the frame memory 340. Accordingly, the image receiving device may restore the received packet to timing information between lines of an image signal that is an image signal before transmitting by the image transmitting device 20.

The second transmission control unit 360 may receive a control signal from an external source and output the control signal to the image transmitting device 20. The second reception control unit 360 may include a host CPU 370 and a fourth memory 380.

The host CPU 370 receives the control signal (i.e., control data) from an external source and outputs the control signal to the fourth memory 380. The control signal may be an audio signal AUX_Tx. The host CPU 370 may receive an audio signal AUX_Rx transmitted by the image transmitting device 20 from the demultiplexing unit 330 and output the audio signal AUX_Rx to an audio output device. The host CPU 370 may communicate with the PHY module 31 and the MAC module 32 via a host bus.

The fourth memory 380 stores the control signal in synchronization with the internal system clock signal SYS_CLK. The control signal is output from the fourth memory 380 to the MAC module 32 in synchronization with the reception clock signal PHY_CLK. The fourth memory 380 may be a FIFO memory.

Figure 11:
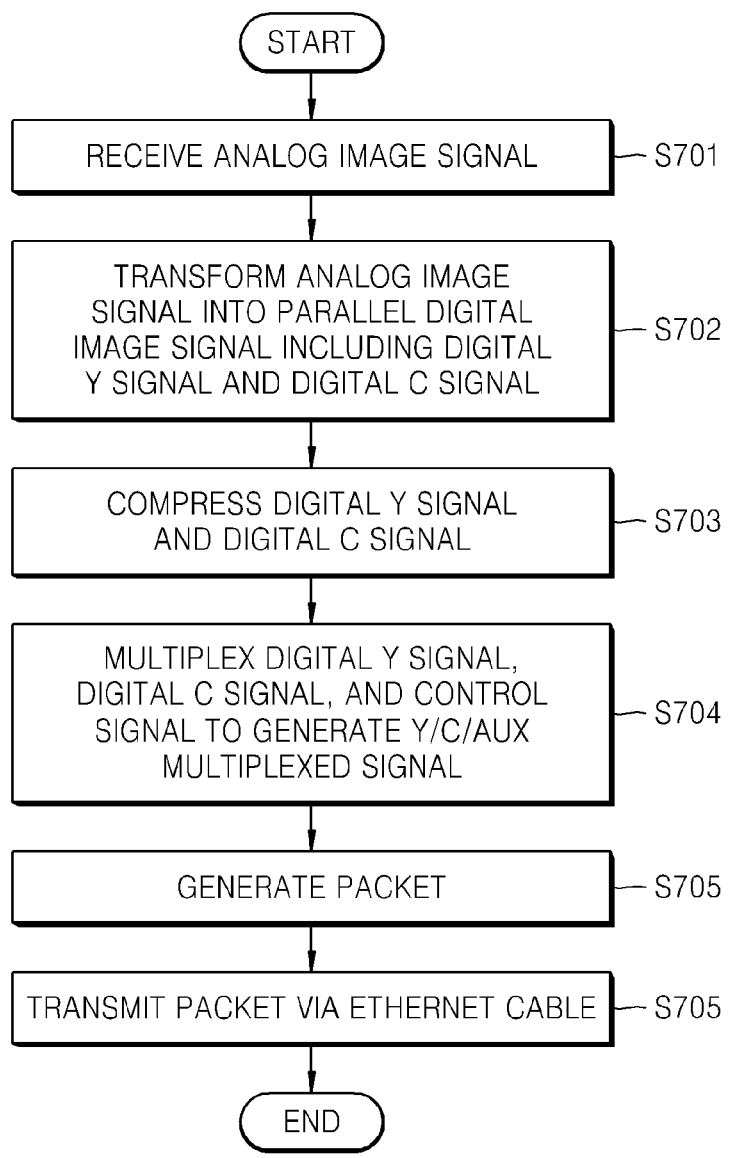
FIG. 11 is a flowchart of a method of transmitting an image in an Ethernet-based digital image transmitting device, according to an exemplary embodiment.

FIG. 11 is a flowchart of a method of transmitting an image in an Ethernet-based image transmitting device, according to an exemplary embodiment. A repeated description of matters described above with reference to FIGS. 1 through 10 is omitted herein. Although the Ethernet-based image transmitting device may receive a control signal from an image receiving device and process the control signal, a method of receiving and processing a control signal is described above, so a detailed description thereof is omitted herein.

Referring to FIG. 11, when the Ethernet-based image transmitting device receives an analog image signal from an image sensor in operation 5701, it transforms the analog image signal into a parallel digital image signal including a Y signal and a C signal, in operation 5702.

In operation 5703, when a bandwidth of a multiplexed signal exceeds an Ethernet transmission bandwidth according to an image resolution, the Ethernet-based image transmitting device may compress the digital Y signal and the digital C signal. The compression is performed using a compression technique having little signal loss.

In operation 5704, the Ethernet-based image transmitting device may multiplex the digital Y signal, the digital C signal, and a control signal received from an audio input device to generate a multiplexed signal. The multiplexing may be performed in units of image lines. The multiplexed signal is stored in a temporary memory, such as a FIFO memory, in synchronization with a system clock signal, and then output in synchronization with a transmission clock signal of an Ethernet-based packet transmission module (i.e., a PHY module).

In operation 5705, the Ethernet-based image transmitting device may generate a packet including the multiplexed signal. The Ethernet-based image transmitting device may generate a packet including at least one multiplexed signal and may or may not insert an image line number into the packet.

In operation S706, the Ethernet-based image transmitting device may transform the packet into an Ethernet transmission format according to an Ethernet protocol and transmit the packet having an Ethernet transmission format via an Ethernet cable. The Ethernet cable may be a UTP cable or an optical fiber cable.

The Ethernet-based image transmitting device may insert an image format, such as image resolution information (e.g., an SD resolution, a full-HD resolution, and the like), into a multiplexed signal during generation of the multiplexed signal or into a packet during generation of the packet.

Figure 12:
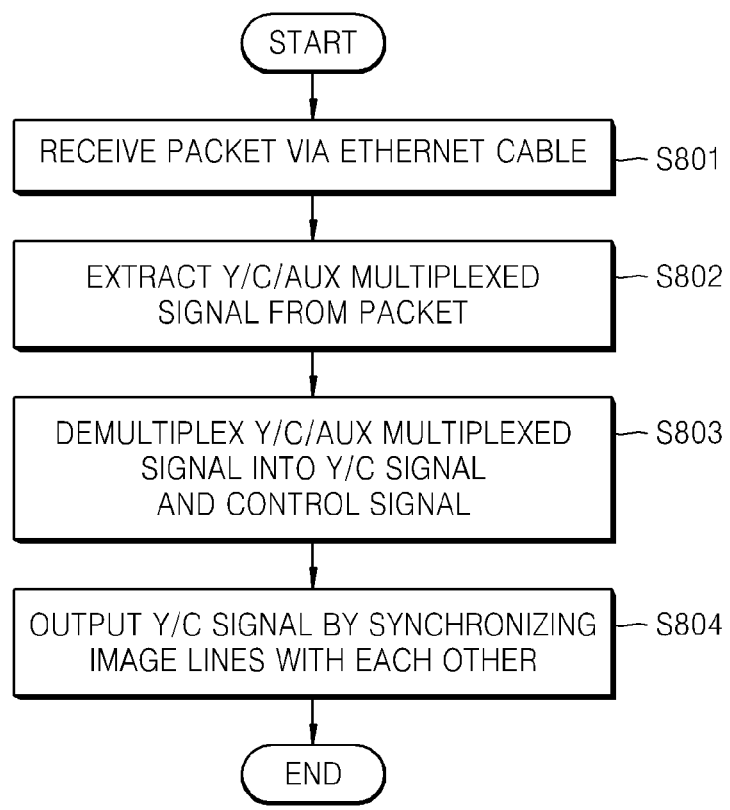
FIG. 12 is a flowchart of a method of receiving and processing an image in an Ethernet-based digital image receiving device, according to an exemplary embodiment.

FIG. 12 is a flowchart of a method of receiving and processing an image in an Ethernet-based image receiving device, according to an exemplary embodiment. A repeated description of matters described above with reference to FIGS. 1 through 10 is omitted herein. Although the Ethernet-based image receiving device may receive a control signal from an external source and transmit the control signal to an image transmitting device, a method of transmitting the control signal was described above, so a detailed description thereof is omitted herein.

Referring to FIG. 12, the Ethernet-based image receiving device may receive a packet including at least one multiplexed signal that has synchronization information and is obtained by multiplexing a Y signal, a C signal, and a control signal, via an Ethernet cable according to an Ethernet protocol, in operation S801. The Ethernet cable may be a UTP cable or an optical fiber cable.

In operation S802, the Ethernet-based image receiving device extracts the multiplexed signal from the packet. When the packet includes an image line number, the Ethernet-based image receiving device may also extract the image line number together with the multiplexed signal from the packet.

In operation S803, the Ethernet-based image receiving device may demultiplex the multiplexed signal into an image signal (i.e., the Y/C signal) and the control signal. The Ethernet-based image receiving device may extract a synchronization signal and image resolution information from the packet. The Ethernet-based image receiving device may temporarily store the multiplexed signal received in synchronization with a reception clock signal of a packet reception module (i.e., a PHY module), and then may output the multiplexed signal in synchronization with an internal system clock signal.

In operation S804, the Ethernet-based image receiving device may store the image signal (i.e., a Y/C signal) in units of image lines and output the image signal by synchronizing the image lines with each other based on the synchronization signal and the image resolution information. The control signal, that is, an audio signal, may be output via an audio output device. The Ethernet-based image receiving device may store the image signal (i.e., a Y/C signal) in units of image lines according to the extracted image line number, and may output the image signal (i.e., a Y/C signal) by synchronizing image lines with each other by synchronizing the image signal with a vertical synchronization signal and a horizontal synchronization signal.

The Ethernet-based image receiving device may perform decompression in case of need, for example, when the image signal (i.e., a Y/C signal) is a compressed image signal.

Figure 13:
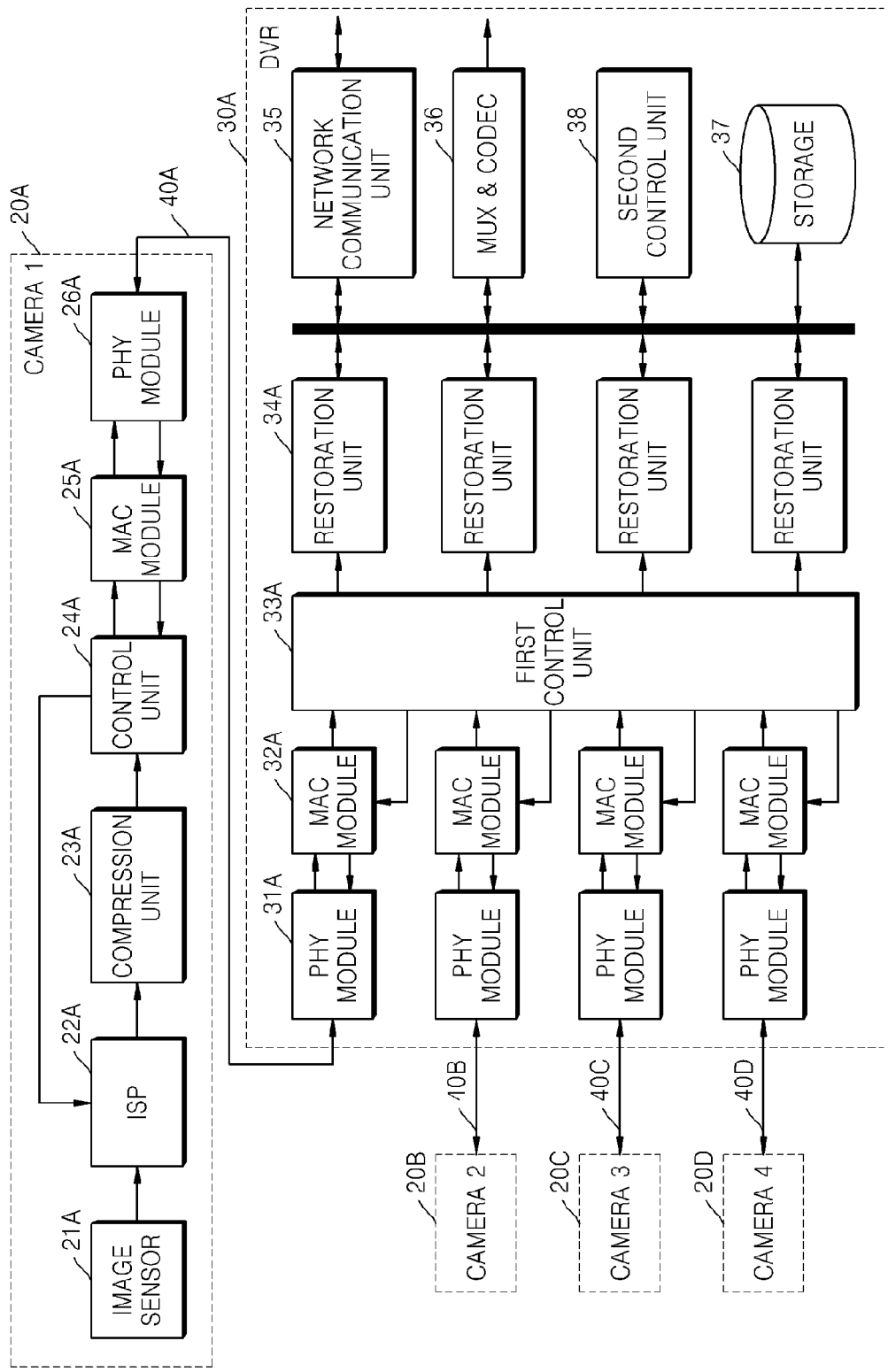
FIG. 13 is a block diagram of an Ethernet-based image transmitting/receiving system according to another exemplary embodiment.

FIG. 13 is a block diagram of an Ethernet-based image transmitting/receiving system according to another exemplary embodiment.

Referring to FIG. 13, an image transmitting device is implemented by using cameras 20A, 20B, 20C, and 20D, and an image receiving device is implemented by using a DVR 30A. The embodiment of FIG. 13 is different from that of FIG. 1 in that at least one camera, namely, the cameras 20A, 20B, 20C, and 20D, is included and the DVR 30A is connected to the cameras 20A, 20B, 20C, and 20D via Ethernet cables 40A, 40B, 40C, and 40D, respectively. Although four (4) cameras are illustrated in FIG. 13 for convenience of explanation, the number of cameras is not limited to four, and a plurality of cameras may be connected to the DVR 30A via cables, respectively.

The camera 20A may include an image sensor 21A, an ISP 22A, a compression unit 23A, a control unit 24A, a MAC module 25A, and a PHY module 26A. Similarly, each of the cameras 20B, 20C, and 20D may include an image sensor, an ISP, a compression unit, a control unit, a MAC module, and a PHY module.

The DVR 30A may include a PHY module 31A, a MAC module 32A, a first control unit 33A, and a restoration unit 34A. The DVR 30A may further include a network communication unit 35, a MUX & codec 36, and a storage 37, which are controlled by a second control unit 38. The DVR 30A may digitally compress an image signal and an audio signal via the MUX & codec 36, store digitally-compressed image and audio signals in the storage 37, and reproduce the digitally-compressed image and audio signals. The DVR 30A may transmit and receive the image and audio signals to and from an external terminal via the network communication unit 35 by wire or wirelessly.

The cameras 20A, 20B, 20C, and 20D are connected to the DVR 30A via the Ethernet cables 40A, 40B, 40C, and 40D, respectively. Each of the Ethernet cables 40A, 40B, 40C, and 40D is the UTP cable, namely, four (4) pairs of Cat5e, or the optical fiber cable.

Since structures and operations of each camera and the DVR 30A are the same as those of the image transmitting device 20 and the image receiving device 30 of FIGS. 1 through 12, respectively, a detailed description thereof is omitted.

Figure 14:
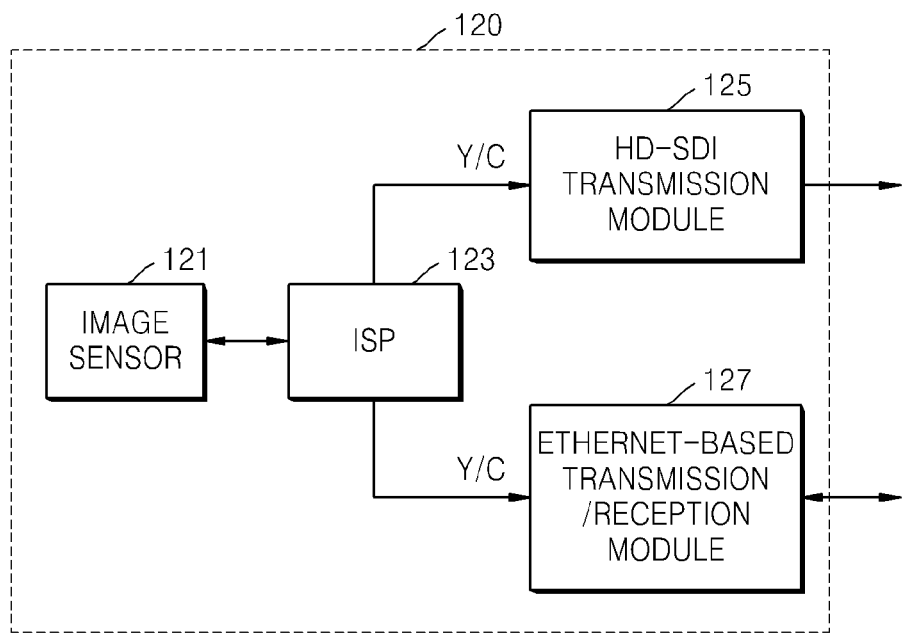
FIG. 14 is a block diagram of a image data transmitting device according to another exemplary embodiment.

FIG. 14 is a block diagram of an image transmitting device 120 according to another exemplary embodiment.

Referring to FIG. 14, the image data transmitting device 120 may include an image sensor 121, an ISP 123, an HD-SDI transmission module 125, and an Ethernet-based transmission/reception module 127.

The digital image data transmitting device 120 transforms an analog image signal output by the image sensor 121 into a digital signal by using the ISP 123. The digital signal includes a Y signal and a C signal having synchronization information.

Figure 15:
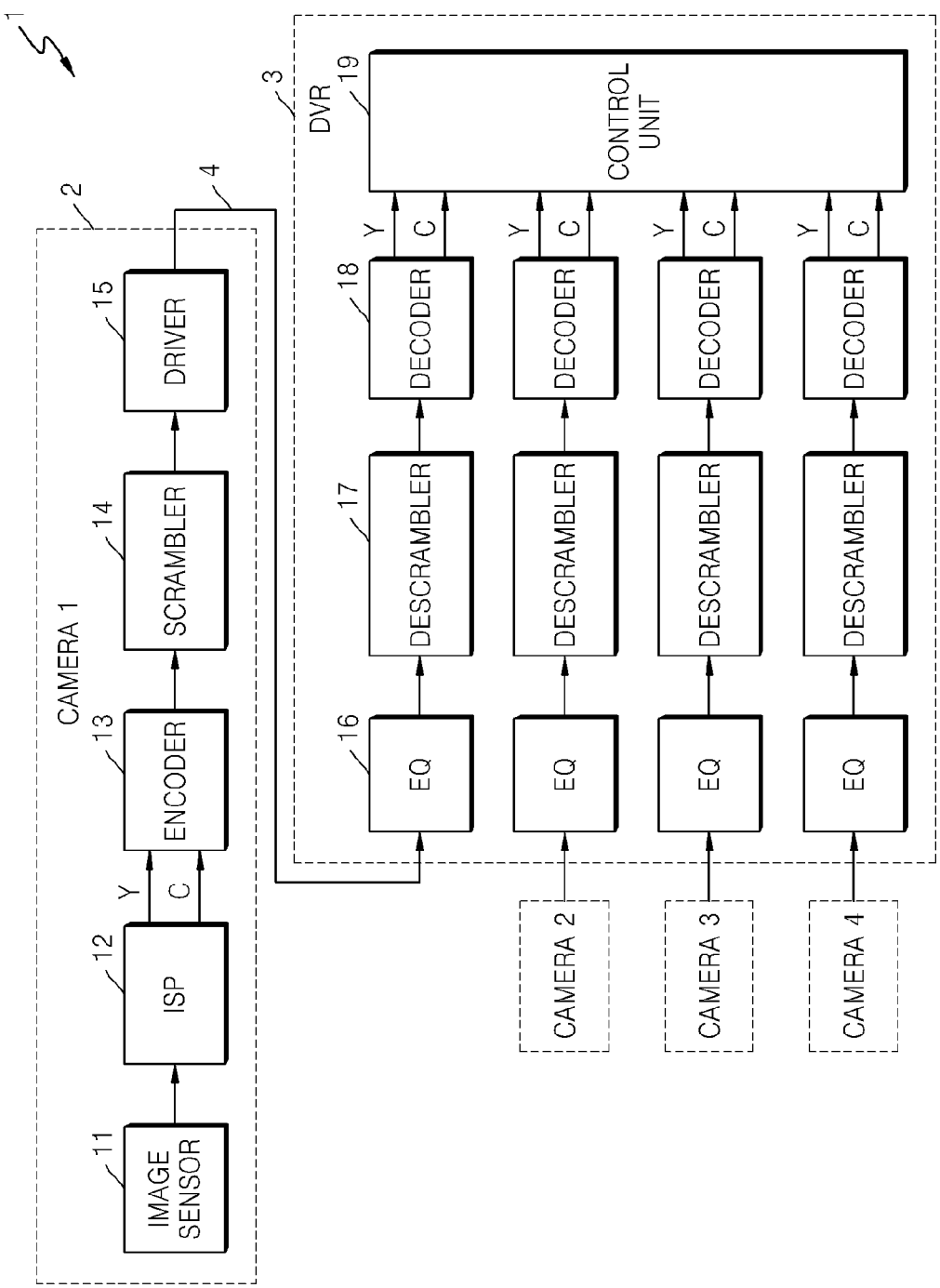
FIG. 15 is a block diagram of a related art image transmitting/receiving system.

In an HD-SDI transmission mode, the Y signal and the C signal are transmitted to the HD-SDI transmission module 125 and processed therein. A structure of the HD-SDI transmission module 125 is the same as that of an image transmitting device 2 of FIG. 15, so a detailed description thereof is omitted.

In an Ethernet-based transmission/reception mode, the Y signal and the C signal are transmitted to the Ethernet-based transmission/reception module 127 and processed therein. A structure of the Ethernet-based transmission/reception module 127 is the same as that of the image transmitting devices 20, 20A to 20D of FIGS. 1 through 12, so a detailed description thereof is omitted.

The image data transmitting device 120 of FIG. 14 is capable of transmitting/receiving an image signal via a coaxial cable in an HD-SDI transmission mode by including a special port, or transmitting/receiving the image signal via an Ethernet cable in an Ethernet-based transmission/reception mode.

According to an exemplary embodiment, a stable transmission band is secured by matching between a Cat5e or Cat6 UTP cable or an optical fiber cable that is cheap due to standardization and a PHY module, and thus transmission loss which is caused in an existing analog transmission method does not occur. Since a digital signal is transmitted without compression such as MPEG/JPEG, degradation of the quality of an image does not occur, a structure of a camera is simple, and delay due to compression/decompression does not occur.

Ethernet transmission is possible by forming a packet with image signals having different data structures and/or different transmission rates and matching the packet with the Giga-PHY module. Synchronization of a transmitting side and a receiving side may be accomplished via a FIFO memory. Since a receiving side includes a memory corresponding to at least one line and controls the memory by reference synchronization based on an image format, packets into which an image signal transmitted via a Giga-PHY module is transformed in units of lines may be restored according to timing information between the lines of the original image signal.

The aforementioned exemplary embodiments using the UTP cable deal with a 1 Gbps Ethernet-based image transmitting/receiving system to which 1000BASE-T PHY technology has been applied. However, the exemplary embodiments are not limited to these embodiments, and may be equally applied to an image transmitting/receiving method based on Ethernet having a transmission capacity extended to several gigabits to several tens of gigabits per second. Accordingly, when an image transmitting/receiving method is based on Ethernet capable of transmitting several tens of gigabits per second, an Ethernet transmission band increases, and thus the number of transmittable/receivable image signals increases. Therefore, image compression may be selectively performed according to the number of transmittable/receivable image signals.

The present inventive concept may be applied to monitoring systems, and is suitable particularly to establish a monitoring environment in small stores where compatibility between transmission and reception is not important. For example, the inventive concept may be applied to monitoring system kits for use in small stores in which four (4) to 16 cameras and a recorder with a monitor constitute a monitoring system kit.

In a system according to the inventive concept, a transmitting device multiplexes a digital image of an HD monitoring camera, which outputs digital data, and a control signal, transforms a multiplexed signal corresponding to a result of the multiplexing into a packet, and transmits the packet to a UTP cable or an optical fiber cable via a general-use PHY module transforming the packet to electrical signal or optical signal according to the transmitting medium. A receiving device receives the electrical signal or optical signal via the general-use PHY module, and transforms the electrical signal or optical signal to the packet, and removes jitter of each packet and corrects synchronization to restore the original image. Accordingly, long-distance transmission/reception of an HD digital image signal may be accomplished at a low cost.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. An Ethernet-based image transmitting device comprising:

a signal processing unit configured to transform an analog image signal received from an image sensor into a digital signal comprising a luminance signal and a chrominance signal;

a control unit configured to multiplex the luminance signal and the chrominance signal to generate a multiplexed signal having synchronization information;

a medium access control (MAC) module configured to generate a packet including at least one multiplexed signal including the multiplexed signal; and a physical (PHY) module configured to transmit the packet in an Ethernet transmission format via an Ethernet cable, wherein the control unit comprises:

a multiplexing unit configured to multiplex the luminance signal and the chrominance signal; and a first memory configured to temporarily store the multiplexed signal in synchronization with an internal clock signal, wherein the temporarily-stored multiplexed signal is output by the MAC module in synchronization with a transmission clock signal of the PHY module.

2. The Ethernet-based image transmitting device of claim 1, further comprising a compression unit configured to compress the luminance signal and the chrominance signal if a bandwidth of the multiplexed signal exceeds an Ethernet transmission bandwidth according to an image resolution.

3. The Ethernet-based image transmitting device of claim 1, wherein the control unit is configured to generate the multiplexed signal in a unit of a line, and insert the synchronization information in a line of the multiplexed signal.

4. The Ethernet-based image transmitting device of claim 2, wherein the synchronization information is inserted in front of and at a rear of the multiplexed signal.

5. The Ethernet-based image transmitting device of claim 1, wherein the MAC module is configured to insert a line number of the multiplexed signal into the packet.

6. The Ethernet-based image transmitting device of claim 1, wherein image resolution information is inserted into the multiplexed signal or the packet.

7. The Ethernet-based image transmitting device of claim 1, wherein the control unit further comprises a second memory configured to temporarily store a control signal received in synchronization with the transmission clock signal of the PHY module via the Ethernet cable and then output the control signal in synchronization with the internal clock signal.

8. The Ethernet-based image transmitting device of claim 1, wherein the Ethernet cable is an unshielded twisted pair (UTP) cable.

9. The Ethernet-based image transmitting device of claim 1, wherein the Ethernet cable is an optical fiber cable.

10. An Ethernet-based image receiving device comprising:

a physical (PHY) module configured to receive a packet comprising at least one multiplexed signal which has synchronization information and is obtained by multiplexing a digital signal comprising a luminance signal and a chrominance signal, via an Ethernet cable;

a medium access control (MAC) module configured to extract the multiplexed signal from the packet; and a control unit configured to separate the luminance signal and the chrominance signal from the multiplexed signal, store the luminance signal and the chrominance signal, and output the luminance signal and the chrominance signal by synchronizing lines with each other based on the synchronization information, wherein the control unit comprises a third memory configured to temporarily store the multiplexed signal received in synchronization with a reception clock signal of the PHY module and then output the multiplexed signal in synchronization with an internal clock signal.

11. The Ethernet-based image receiving device of claim 10, wherein the control unit further comprises:

a demultiplexing unit configured to demultiplex the multiplexed signal into the luminance signal and the chrominance signal;

a frame memory configured to store the luminance signal and the chrominance signal in units of lines; and a synchronization signal generation unit configured to generate a vertical synchronization signal and a horizontal synchronization signal based on the synchronization information so that the luminance signal and the chrominance signal stored in the frame memory are output by synchronizing lines with each other.

12. The Ethernet-based image receiving device of claim 11, wherein the demultiplexing unit separates a control signal from the multiplexed signal.

13. The Ethernet-based image receiving device of claim 11, wherein the frame memory is configured to store the luminance signal and the chrominance signal in a corresponding line region based on a line number included in the packet.

14. The Ethernet-based image receiving device of claim 10, wherein the control unit further comprises a fourth memory configured to temporarily store a control signal received from an external source and output the control signal in synchronization with the reception clock signal.

15. The Ethernet-based image receiving device of claim 10, further comprising a restoration unit configured to perform decompression if the luminance signal and the chrominance signal are compressed signals.

16. The Ethernet-based image receiving device of claim 10, wherein the Ethernet cable is a UTP cable.

17. The Ethernet-based image receiving device of claim 10, wherein the Ethernet cable is an optical fiber cable.

18. An Ethernet-based image transmitting/receiving system comprising:

a digital image transmitting device configured to transform an analog image signal received from an image sensor into a digital signal including a luminance signal and a chrominance signal, multiplex the luminance signal and the chrominance signal to generate a multiplexed signal having synchronization information, and generate and transmit a packet including at least one multiplexed signal; a digital image receiving device configured to receive the packet, extracts the multiplexed signal from the packet, separate the luminance signal and the chrominance signal from the multiplexed signal, store the luminance signal and the chrominance signal, and output the luminance signal and the chrominance signal by synchronizing lines with each other based on the synchronization information; and an Ethernet cable configured to connect the digital image transmitting device to the digital image receiving device and transmit the packet, wherein the digital image transmitting device is configured to temporarily store the multiplexed signal and then output the multiplexed signal in synchronization with a transmission clock signal of a packet transmission module, and the digital image receiving device is configured to temporarily store the multiplexed signal received in synchronization with a reception clock signal of a packet reception module and then output the multiplexed signal in synchronization with an internal clock signal, and store the luminance signal and the chrominance signal separated from the multiplexed signal, in units of lines, and then output the luminance signal and the chrominance signal by synchronizing lines with each other based on the synchronization information.

19. The Ethernet-based image transmitting/receiving system of claim 18, wherein:
the digital image transmitting device comprises a compression unit configured to compress the luminance signal and the chrominance signal if a bandwidth of the multiplexed signal exceeds an Ethernet transmission bandwidth according to an image resolution, and
the digital image receiving device comprises a restoration unit configured to decompress the compressed luminance signal and the compressed chrominance signal which are output by synchronizing lines with each other based on the synchronization information.

20. The Ethernet-based image transmitting/receiving system of claim 18, wherein
the digital image transmitting device is configured to insert a line number of the multiplexed signal into the packet, and
the digital image receiving device is configured to store the luminance signal and the chrominance signal in a frame memory, based on the line number.

21. The Ethernet-based image transmitting/receiving system of claim 18, wherein the Ethernet cable is a UTP cable.

22. The Ethernet-based image transmitting/receiving system of claim 18, wherein the Ethernet cable is an optical fiber cable.

* * * * *